US012241361B2

(12) United States Patent
Xia et al.

(10) Patent No.: US 12,241,361 B2
(45) Date of Patent: Mar. 4, 2025

(54) METHOD AND SYSTEM TO DETERMINE OPTIMAL PERFORATION ORIENTATION FOR HYDRAULIC FRACTURING SLANT WELLS

(71) Applicant: Saudi Arabian Oil Company, Dhahran (SA)

(72) Inventors: Kaiming Xia, Dhahran (SA); Yufeng Cui, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 422 days.

(21) Appl. No.: 17/410,756

(22) Filed: Aug. 24, 2021

(65) Prior Publication Data
US 2023/0064121 A1    Mar. 2, 2023

(51) Int. Cl.
*E21B 47/00*    (2012.01)
*E21B 43/26*    (2006.01)
(Continued)

(52) U.S. Cl.
CPC .......... *E21B 47/0025* (2020.05); *E21B 43/26* (2013.01); *G01V 1/40* (2013.01)

(58) Field of Classification Search
CPC ........ E21B 47/0025; E21B 43/26; G01V 1/40
See application file for complete search history.

(56) References Cited

U.S. PATENT DOCUMENTS 4,211,106 A    7/1980    Swanson
4,542,648 A    9/1985    Vinegar et al.
(Continued)

FOREIGN PATENT DOCUMENTS

AU    2013206713    7/2013
CA    2884071    3/2014
(Continued)

OTHER PUBLICATIONS

Alizadeh et al. In-situ stress analysis using image logs. (Year 2015).*
(Continued)

*Primary Examiner* — Mohamed Charioui
*Assistant Examiner* — Lynda Dinh
(74) *Attorney, Agent, or Firm* — Fish & Richardson P.C.

(57) ABSTRACT

Systems and methods for determining optimal perforation orientations for hydraulic fracturing of wells in a subterranean formation are presented. The method comprises identifying in-situ stresses for a portion of a well bore formed and transforming the in-situ stresses between coordinate systems. Pressure coefficients and a breakdown pressure for each trial perforation phase angle at a perforation cluster determined, and a perforation point in the well bore coordinate system is calculated for each trial perforation phase angle of the perforation cluster. The perforation point in the well bore coordinate system is transformed to the translated global coordinate system for each trial perforation phase angle. A target perforation phase angle is selected at a minimum breakdown pressure for the perforation cluster, and a perforation azimuth and perforation dip is calculated for the perforation cluster at the minimum breakdown pressure for the target perforation phase angles.

17 Claims, 14 Drawing Sheets

(51) Int. Cl.
  *E21B 47/002* (2012.01)
  *G01V 1/40* (2006.01)

(56) References Cited

U.S. PATENT DOCUMENTS

| | | | |
|---|---|---|---|
| 4,628,468 | A | 12/1986 | Thompson et al. |
| 4,648,261 | A | 3/1987 | Thompson et al. |
| 5,069,065 | A | 12/1991 | Sprunt et al. |
| 5,386,875 | A * | 2/1995 | Venditto .............. E21B 43/26 166/308.1 |
| 5,482,116 | A | 1/1996 | El-Rabaa et al. |
| 6,088,656 | A | 7/2000 | Ramakrishnan et al. |
| 6,186,230 | B1 * | 2/2001 | Nierode ............... E21B 43/26 166/308.1 |
| 6,229,308 | B1 | 5/2001 | Freedman |
| 6,351,991 | B1 * | 3/2002 | Sinha ..................... G01V 1/50 73/152.16 |
| 6,724,687 | B1 | 4/2004 | Stephenson et al. |
| 6,977,499 | B2 | 12/2005 | Kiesl et al. |
| 6,987,385 | B2 | 1/2006 | Akkurt et al. |
| 7,073,578 | B2 | 7/2006 | Vinegar et al. |
| 7,121,342 | B2 | 10/2006 | Vinegar et al. |
| 7,360,588 | B2 | 4/2008 | Vinegar et al. |
| 7,363,158 | B2 | 4/2008 | Stelting et al. |
| 7,890,307 | B2 | 2/2011 | Geehan et al. |
| 7,942,203 | B2 | 5/2011 | Vinegar et al. |
| 7,970,545 | B2 | 6/2011 | Sanstrom |
| 8,127,848 | B2 | 3/2012 | Myers et al. |
| 8,385,604 | B2 | 2/2013 | Orpen |
| 8,443,886 | B2 | 5/2013 | Torres et al. |
| 8,579,031 | B2 | 11/2013 | Vinegar |
| 8,605,951 | B2 | 12/2013 | Baggs et al. |
| 9,081,117 | B2 | 7/2015 | Wu et al. |
| 9,222,337 | B2 | 12/2015 | Bunger et al. |
| 9,915,137 | B2 * | 3/2018 | Alekseenko .......... E21B 43/267 |
| 9,945,215 | B2 | 4/2018 | Godfrey |
| 10,428,263 | B2 | 10/2019 | Babcock et al. |
| 2003/0150263 | A1 * | 8/2003 | Economides ......... E21B 49/006 166/250.14 |
| 2007/0239359 | A1 | 10/2007 | Stelting et al. |
| 2010/0198638 | A1 | 8/2010 | Deffenbaugh et al. |
| 2010/0305927 | A1 | 12/2010 | Suarez-Rivera et al. |
| 2011/0257944 | A1 * | 10/2011 | Du ........................ E21B 43/267 703/2 |
| 2012/0221306 | A1 | 8/2012 | Hurley et al. |
| 2013/0080133 | A1 | 3/2013 | Sung et al. |
| 2013/0259190 | A1 | 10/2013 | Walls et al. |
| 2013/0297272 | A1 | 11/2013 | Sung et al. |
| 2015/0198036 | A1 | 7/2015 | Kleinberg et al. |
| 2016/0045841 | A1 | 2/2016 | Kaplan et al. |
| 2017/0096881 | A1 | 4/2017 | Dusterhoft et al. |
| 2017/0275975 | A1 * | 9/2017 | Hardesty .............. E21B 43/119 |
| 2017/0362935 | A1 * | 12/2017 | Batmaz ................. E21B 47/002 |
| 2018/0010429 | A1 * | 1/2018 | Willberg ................ E21B 43/26 |
| 2018/0293789 | A1 | 10/2018 | Shen et al. |
| 2018/0320514 | A1 | 11/2018 | Felkl et al. |
| 2020/0399993 | A1 * | 12/2020 | Grove .................... E21B 43/119 |
| 2021/0010368 | A1 * | 1/2021 | Hai ....................... E21B 47/047 |

FOREIGN PATENT DOCUMENTS

| | | |
|---|---|---|
| CN | 103726819 | 4/2014 |
| CN | 104459775 | 2/2017 |
| CN | 109711595 | 5/2019 |
| KR | 101620506 | 5/2016 |
| RU | 2404356 | 11/2010 |
| WO | WO 2013173404 | 11/2013 |
| WO | WO 2014146004 | 9/2014 |
| WO | WO 2016100762 | 6/2016 |
| WO | WO 2018/117890 * | 6/2018 |

OTHER PUBLICATIONS

Zhang. Situ Stress State—an overview | ScienceDirect Topics. (Year 2019).*
U.S. Appl. No. 17/075,342, Xia et al.
U.S. Appl. No. 17/140,252, Xia et al.
U.S. Appl. No. 17/168,734, Xia et al.
Abaqus, "Concreate Damaged Plasticity," ABAQUS Online Manual, 2019, 14 pages.
Abass et al., "Oriented Perforations—A Rock Mechanics View," SPE 28555, Society of Petroleum Engineers (SPE), The SPE Annual Technical Meeting, News Orleans, Sep. 25-28, 1994, 15 pages.
Alekseenko et al., "3-D modeling of fracture initiation from perforated non-cemented wellbore," SPE 151585, Society of Petroleum Engineers (SPE), the Proceeding of The SPE Hydraulic Fracturing Technology Conference held in The Woodlands, Texas, USA, Feb. 2012, 12 pages.
Almaguer et al., "Orienting Perforations in the Right Direction," Oilfield Review, 2002, 16 pages.
Ben et al., "Real-time hydraulic fracturing pressure prediction with machine learning," SPE-199699-MS, Society of Petroleum Engineers (SPE), presented at the SPE Hydraulic Fracturing Technology Conference and Exhibition, The Woodlands, TX, USA, Feb. 4-6, 2020, 14 pages.
Brown, "Porosity Variation in Carbonates as a Function of Depth: Mississippian Madison Group, Williston Basin," Chapter 3, found in Kupecz et al., Reservoir quality prediction in sandstones and carbonates, AAPG Memoir 69, Jan. 1, 1997, 8 pages.
Buiting et al., "Permeability from porosimetry measurements: Derivation for a tortuous and fractal tubular bundle," Journal of Petroleum Science and Engineering 108, Aug. 2013, 267-278, 12 pages.
Carey et al., "Analysis of water hammer signatures for fracture diagnostics." SPE-174866-MS, Society of Petroleum Engineers (SPE), SPE Annual Technical Conference and Exhibition, Sep. 2015, 25 pages.
Chen et al., "XGBoost: a scalable tree boosting system," Proceedings of the 22nd ACM International Conference on Knowledge Discovery and Data Mining, ACM, Aug. 2016, 13 pages.
Clerke et al., "Application of Thomeer Hyperbolas to decode the pore systems, facies and reservoir properties of the Upper Jurassic Arab D Limestone, Ghawar field, Saudi Arabia: a "Rosetta Stone" approach, " GeoArabia 13.4, Oct. 2008, 113-160, 48 pages.
DMT, "DMT CoreScan 3 High-Tech Core Logging Tool"; http://www.corescan.de/fileadmin/downloads/DMT_CoreScan3_Info.pdf; Jan. 31, 2013, 1-20, 20 pages.
Dunham et al., "Hydraulic fracture conductivity inferred from tube wave reflections." SEG Technical Program Expanded Abstracts 2017. Society of Exploration Geophysicists, Sep. 2017, 947-952, 6 pages.
El-Rabaa et al., "New perforation pressure loss correlations for limited entry fracturing treatments," SPE-38373, Society of Petroleum Engineers (SPE), Proceedings of the SPE Rocky Mountain Regional Meeting, Casper, Wyoming, May 18-21, 1997, 9 pages.
Enos and Sawatsky, "Pore networks in holocene carbonate sediments," Journal of Sedimentary Research 51:3, Jan. 1981, 26 pages.
Fallahzadeh et al., "Modeling the Perforation Stress Profile for Analyzing Hydraulic Fracture Initiation in a Cased Hole," SPE 136990, Society of Petroleum Engineers (SPE), presented at the 34th Annual SPE International Conference and Exhibition held in Tinapa—Calabar, Nigeria, Jul. 31-Aug. 7, 2010, 18 pages.
Gaillot et al., "Contribution of Borehole Digital Imagery in Core-Logic-Seismic Integration," Scientific Drilling, No. 5, Sep. 2007, 50-53, 4 pages.
Haimson et al., "Initiation and extension of hydraulic fractures in rock," Society of Petroleum Engineers. V.7, Sep. 1967, 310-318, 9 pages.
Hossain et al., "Hydraulic fracture initiation and propagation: roles of wellbore trajectory," Perforation and stress reginme. J. Pet. Sci. & Eng. 27, Sep. 2000, 129-149, 21 pages.

(56) References Cited

OTHER PUBLICATIONS

Hubbert et al., "Mechanics of hydraulic fracturing," Petroleum Transaction, Aime. V.210, Dec. 1957, 153-168, 16 pages.
Huet et al., "A modified purcell/burdine model for estimating absolute permeability from mercury-injection capillary pressure data," International petroleum technology conference. vol. 10994. International Petroleum Technology Conference, Nov. 2005, 39 pages.
Jia et al., "Comparison of Three Capillary Fractal Models for Reservoir Evaluation," Electronic Journal of Geotechnical Engineering 21.5, Jan. 2016, 1977-1986, 9 pages.
Kewen, "Characterization of rock heterogeneity using fractal geometry," SPE 86975, Society of Petroleum Engineers (SPE), SPE International Thermal Operations and Heavy Oil Symposium and Western Regional Meeting, Mar. 2004, 7 pages.
Kurdi et al., "A New Computational Model to Predict Breakdown Pressures in Cased and Perforated Wells in Unconventional Reservoirs," ASEG Extended Abstracts, Sep. 2018, 10 pages.
Lander and Walderhaug, "Predicting Porosity through Simulating Sandstone Compaction and Quartz Cementation," AAPG Bulletin, 83:3, Mar. 1999, 17 pages.
Liang et al., "Hydraulic fracture diagnostics from Krauklis-wave resonance and tube-wave reflections." Geophysics 82.3, May 2017, D171-D186, 16 pages.
Liu et al., "Determining the segmentation point for calculating the fractal dimension from mercury injection capillary pressure curves in tight sandstone." Journal of Geophysics and Engineering 15.4, Aug. 2018, 1350-1362, 13 pages.
Lubliner, "A Plastic-Damage Model for Concrete" International Journal of Solids and Structures, 25:3, Jan. 1989, 28 pages.
Makhotin et al., "Gradient boosting to boost the efficiency of hydraulic fracturing," Journal of Petroleum Exploration and Production Technology, Sep. 2019, 9(4):1919-1925, 10 pages.
Michael, "Orientation of hydraulic fracture initiation from perforated horizontal wellbore," SPE-199766-STU. The SPE Annual Technical Conference and Exhibition held in Calgary, Canada, Oct. 2019, 23 pages.
Morozov et al., "Machine Learning on Field Data for Hydraulic Design Optimization: Digital Database and Production Forecast Model," European Association of Geoscientists and Engineers, presented at the First EAGE Digitalization Conference and Exhibition, Conference Proceedings, Nov. 2020, :1-5, 1 page, Summary Only.
Mutalova et al., "Machine learning on field data for hydraulic fracturing design optimization," Journal of Petroleum Science and Engineering, Special Issue: Petroleum Data Science, Oct. 7, 2019, 21 pages.
Nande, "Application of machine learning for closure pressure determination," SPE-194042-STU, Society of Petroleum Engineers (SPE), presented at the 2018 SPE Annual Technical Conference and Exhibition, Dallas, TX, Sep. 24-26, 2018, 10 pages.
Paulsen et al., "A Simple Method for Orienting Drill Core by Correlating Features in Whole-Core Scans and Oriented Borehole-Wall Imagery" Journal of Structural Geology; Aug. 2002, 1233-1238, 6 pages.

Pittman et al., "Relationship of Porosity and Permeability to Various Parameters Derived from Mercury Injection-Capillary Pressure Curve for Sandstone," AAPG Bulletin 76.2, Feb. 1992, 8 pages.
Purcell, "Capillary pressures-their measurement using mercury and the calculation of permeability therefrom," Journal of Petroleum Technology, 1.02, Feb. 1949, 39-48, 10 pages.
Schmoker, "Empirical Relation Between Carbonate Porosity and Thermal Maturity: an Approach to Regional Porosity Prediction," The American Association of Petroleum Geologists, vol. 68, No. 11, Nov. 1984, 7 pages.
Shi et al., "An analytical solution to stress state of casing-cement sheath-formation system with the consideration of its initial loaded state and wellbore temperature variation," International Journal of Emerging Technology and Advanced Engineering 5.1, Jan. 2015, 59-65, 12 pages.
Swanson, "A Simple Correlation Between Permeabilities and Capillary Pressures," Journal of Petroleum Technology, Dec. 1981, 2498-2504, 7 pages.
Tamez et al., "Machine learning application to hydraulic fracturing," Proceedings SPIE 10989, Big Data: Learning, Analytics, and Applications, May 13, 2019, Baltimore, Maryland, 109890A, 1 page, Abstract Only.
Tang et al., "A dynamic model for fluid flow in open borehole fractures," Journal of Geophysical Research: Solid Earth, 94(B6), Jun. 1989, 7567-7576, 10 pages.
Teagle et al., "Methods," Proceedings of the Integrated Ocean Drilling Program, 309/312; Published in 2006, 1-70, 70 pages.
Thomeer, "Introduction of a Pore Geometrical Factor Defined by the Capillary Pressure Curve," Petroleum Transactions of the AIME, Mar. 1960, 73-77, 5 pages.
Wang et al., "Analysis of Pore Size Distribution and Fractal Dimension in Tight Sandstone with Mercury Intrusion Porosimetry," Results in Physics 13, Jun. 2019, 10 pages.
Waters et al., "The impact of geomechanics and perforations on hydraulic fracture initiation and complexity in horizontal well completions," SPE-181684-MS, Society of Petroleum Engineers (SPE), The Proceedings of the SPE Annual Technical Conference and Exhibition held in Dubai, UAE, Sep. 26-28, 2016, 36 pages.
WellCAD Software, "4.4 Book 1—Basics," V2011.10.17, ALT, Oct. 17, 2011, 11 pages.
Weng et al., "Analytical model for predicting fracture initiation pressure from a cased and perforated wellbore" SPE-191462-18IHFT-MS, Society of Petroleum Engineers (SPE), The Proceeding of the SPE International Hydraulic Fracturing Technology Conference and Exhibition. Muscat, Oman, Oct. 16-18, 2018, 21 pages.
Wilkens et al., "Data Report: Digital Core Images as Data: an Example from IODP Expedition 303", Proceedings of the Integrated Ocean Drilling Program, vol. 303/306; Published in 2009, 1-16, 16 pages.
Zeng et al., "Perforation orientation optimization to reduce the fracture initiation pressure of a deviated cased hole," Journal of Petroleum Science and Engineering, Mar. 2019, 177: 829-840, 12 pages.
Zhang et al., "Modeling carbonate diagenesis for reservoir quality prediction: Predicting cementation and compaction from mud content using petrographic data from carbonate reservoir in a giant oil field," AAPG, Aug. 3, 2016, 1 page.

* cited by examiner

300

400

| MD | Azimuth | Deviation | Casing ID | Casing OD | Cement ID | Cement OD | Borehole ID | Casing YM | Casing PR | Cement YM | Cement PR | Rock YM | Rock PR |
|---|---|---|---|---|---|---|---|---|---|---|---|---|---|
| ft | degree | degree | in | in | in | in | in | psi | | psi | | psi | |
| 10000 | 0 | 85 | 4.09 | 4.5 | 4.5 | 5.875 | 5.875 | 29000000 | 0.2 | 250000 | 0.2 | 3000000 | 0.22 |
| 10500 | 1 | 86 | 4.09 | 4.5 | 4.5 | 5.875 | 5.875 | 29000000 | 0.2 | 250000 | 0.2 | 3000000 | 0.22 |
| 11000 | 2 | 87 | 4.09 | 4.5 | 4.5 | 5.875 | 5.875 | 29000000 | 0.2 | 250000 | 0.2 | 3000000 | 0.22 |
| 11500 | 3 | 88 | 4.09 | 4.5 | 4.5 | 5.875 | 5.875 | 29000000 | 0.2 | 250000 | 0.2 | 3000000 | 0.22 |
| 12000 | 4 | 89 | 4.09 | 4.5 | 4.5 | 5.875 | 5.875 | 29000000 | 0.2 | 250000 | 0.2 | 3000000 | 0.22 |
| 12500 | 5 | 90 | 4.09 | 4.5 | 4.5 | 5.875 | 5.875 | 29000000 | 0.2 | 250000 | 0.2 | 3000000 | 0.22 |
| 13000 | 6 | 91 | 4.09 | 4.5 | 4.5 | 5.875 | 5.875 | 29000000 | 0.2 | 250000 | 0.2 | 3000000 | 0.22 |
| 13500 | 7 | 92 | 4.09 | 4.5 | 4.5 | 5.875 | 5.875 | 29000000 | 0.2 | 250000 | 0.2 | 3000000 | 0.22 |
| 14000 | 8 | 93 | 4.09 | 4.5 | 4.5 | 5.875 | 5.875 | 29000000 | 0.2 | 250000 | 0.2 | 3000000 | 0.22 |
| 14500 | 9 | 94 | 4.09 | 4.5 | 4.5 | 5.875 | 5.875 | 29000000 | 0.2 | 250000 | 0.2 | 3000000 | 0.22 |
| 15000 | 10 | 95 | 4.09 | 4.5 | 4.5 | 5.875 | 5.875 | 29000000 | 0.2 | 250000 | 0.2 | 3000000 | 0.22 |

| MD | Azimuth | Deviation | Sv | Shmin | Shmax | Shmax Azi | PP | Pw_min | Phase Angle_1 | Perf_Azi_1 | Phase Angle_2 | Perf_Azi_2 |
|---|---|---|---|---|---|---|---|---|---|---|---|---|
| ft | degree | degree | psi | psi | psi | degree | psi | psi | degree | degree | degree | degree |
| 10000 | 90 | 10 | 10500 | 2961.54 | 3701.92 | 0 | 5000 | 4185.8 | 90 | 180 | 270 | 0 |
| 10500 | 90 | 20 | 10500 | 2961.54 | 3701.92 | 0 | 5000 | 4232.5 | 90 | 180 | 270 | 0 |
| 11000 | 90 | 30 | 10500 | 2961.54 | 3701.92 | 0 | 5000 | 4306.4 | 90 | 108 | 270 | 0 |
| 11500 | 90 | 40 | 10500 | 2961.54 | 3701.92 | 0 | 5000 | 4401.2 | 90 | 108 | 270 | 0 |
| 12000 | 90 | 50 | 10500 | 2961.54 | 3701.92 | 0 | 5000 | 4507.4 | 90 | 108 | 270 | 0 |
| 12500 | 90 | 60 | 10500 | 2961.54 | 3701.92 | 0 | 5000 | 4612.7 | 90 | 108 | 270 | 0 |
| 13000 | 90 | 70 | 10500 | 2961.54 | 3701.92 | 0 | 5000 | 4702.9 | 90 | 108 | 270 | 0 |
| 13500 | 90 | 80 | 10500 | 2961.54 | 3701.92 | 0 | 5000 | 4764 | 90 | 108 | 270 | 0 |
| 14000 | 90 | 85 | 10500 | 2961.54 | 3701.92 | 0 | 5000 | 4780.2 | 90 | 108 | 270 | 0 |
| 14500 | 90 | 90 | 10500 | 2961.54 | 3701.92 | 0 | 5000 | 4785.6 | 90 | 108 | 270 | 0 |
| 15000 | 90 | 95 | 10500 | 2961.54 | 3701.92 | 0 | 5000 | 4780.2 | 90 | 108 | 270 | 0 |

| MD | Azimuth | Deviation | Casing ID | Casing OD | Cement ID | Cement OD | Borehole ID | Casing YM | Casing PR | Cement YM | Cement PR | Rock YM | Rock PR |
|---|---|---|---|---|---|---|---|---|---|---|---|---|---|
| ft | degree | degree | in | in | in | in | in | psi | | psi | | psi | |
| 10000 | 0 | 90 | 4.09 | 4.5 | 4.5 | 5.875 | 5.875 | 29000000 | 0.2 | 250000 | 0.2 | 3000000 | 0.22 |
| 10500 | 10 | 90 | 4.09 | 4.5 | 4.5 | 5.875 | 5.875 | 29000000 | 0.2 | 250000 | 0.2 | 3000000 | 0.22 |
| 11000 | 20 | 90 | 4.09 | 4.5 | 4.5 | 5.875 | 5.875 | 29000000 | 0.2 | 250000 | 0.2 | 3000000 | 0.22 |
| 11500 | 30 | 90 | 4.09 | 4.5 | 4.5 | 5.875 | 5.875 | 29000000 | 0.2 | 250000 | 0.2 | 3000000 | 0.22 |
| 12000 | 40 | 90 | 4.09 | 4.5 | 4.5 | 5.875 | 5.875 | 29000000 | 0.2 | 250000 | 0.2 | 3000000 | 0.22 |
| 12500 | 50 | 90 | 4.09 | 4.5 | 4.5 | 5.875 | 5.875 | 29000000 | 0.2 | 250000 | 0.2 | 3000000 | 0.22 |
| 13000 | 60 | 90 | 4.09 | 4.5 | 4.5 | 5.875 | 5.875 | 29000000 | 0.2 | 250000 | 0.2 | 3000000 | 0.22 |
| 13500 | 70 | 90 | 4.09 | 4.5 | 4.5 | 5.875 | 5.875 | 29000000 | 0.2 | 250000 | 0.2 | 3000000 | 0.22 |
| 14000 | 80 | 90 | 4.09 | 4.5 | 4.5 | 5.875 | 5.875 | 29000000 | 0.2 | 250000 | 0.2 | 3000000 | 0.22 |
| 14500 | 90 | 90 | 4.09 | 4.5 | 4.5 | 5.875 | 5.875 | 29000000 | 0.2 | 250000 | 0.2 | 3000000 | 0.22 |
| 15000 | 100 | 90 | 4.09 | 4.5 | 4.5 | 5.875 | 5.875 | 29000000 | 0.2 | 250000 | 0.2 | 3000000 | 0.22 |

| MD | Azimuth | Deviation | Sv | Shmin | Shmax | Shmax Azi | PP | Pw_min | Phase Angle_1 | Perf_Azi_1 | Phase Angle_2 | Perf_Azi_2 |
|---|---|---|---|---|---|---|---|---|---|---|---|---|
| ft | degree | degree | psi | psi | psi | degree | psi | psi | degree | degree | degree | degree |
| 10000 | 0 | 90 | 10500 | 2961.54 | 3701.92 | 0 | 5000 | 7210.1 | 90 | 90 | 270 | 270 |
| 10500 | 10 | 90 | 10500 | 2961.54 | 3701.92 | 0 | 5000 | 7137 | 90 | 100 | 270 | 280 |
| 11000 | 20 | 90 | 10500 | 2961.54 | 3701.92 | 0 | 5000 | 6926.5 | 90 | 110 | 270 | 290 |
| 11500 | 30 | 90 | 10500 | 2961.54 | 3701.92 | 0 | 5000 | 6604 | 90 | 120 | 270 | 300 |
| 12000 | 40 | 90 | 10500 | 2961.54 | 3701.92 | 0 | 5000 | 6208.4 | 90 | 130 | 270 | 310 |
| 12500 | 50 | 90 | 10500 | 2961.54 | 3701.92 | 0 | 5000 | 5787.4 | 90 | 140 | 270 | 320 |
| 13000 | 60 | 90 | 10500 | 2961.54 | 3701.92 | 0 | 5000 | 5391.8 | 90 | 150 | 270 | 330 |
| 13500 | 70 | 90 | 10500 | 2961.54 | 3701.92 | 0 | 5000 | 5069.2 | 90 | 160 | 270 | 340 |
| 14000 | 80 | 90 | 10500 | 2961.54 | 3701.92 | 0 | 5000 | 4858.8 | 90 | 170 | 270 | 350 |
| 14500 | 90 | 90 | 10500 | 2961.54 | 3701.92 | 0 | 5000 | 4785.6 | 90 | 180 | 270 | 0 |
| 15000 | 100 | 90 | 10500 | 2961.54 | 3701.92 | 0 | 5000 | 4858.8 | 90 | 190 | 270 | 10 |

| MD | Azimuth | Deviation | Casing ID | Casing OD | Cement ID | Cement OD | Borehole ID | Casing YM | Casing PR | Cement YM | Cement PR | Rock YM | Rock PR |
|---|---|---|---|---|---|---|---|---|---|---|---|---|---|
| ft | degree | degree | in | in | in | in | in | psi | | psi | | psi | |
| 10000 | 0 | 90 | 4.09 | 4.5 | 4.5 | 5.875 | 5.875 | 29000000 | 0.2 | 250000 | 0.2 | 3000000 | 0.22 |
| 10500 | 10 | 90 | 4.09 | 4.5 | 4.5 | 5.875 | 5.875 | 29000000 | 0.2 | 250000 | 0.2 | 3000000 | 0.22 |
| 11000 | 20 | 90 | 4.09 | 4.5 | 4.5 | 5.875 | 5.875 | 29000000 | 0.2 | 250000 | 0.2 | 3000000 | 0.22 |
| 11500 | 30 | 90 | 4.09 | 4.5 | 4.5 | 5.875 | 5.875 | 29000000 | 0.2 | 250000 | 0.2 | 3000000 | 0.22 |
| 12000 | 40 | 90 | 4.09 | 4.5 | 4.5 | 5.875 | 5.875 | 29000000 | 0.2 | 250000 | 0.2 | 3000000 | 0.22 |
| 12500 | 50 | 90 | 4.09 | 4.5 | 4.5 | 5.875 | 5.875 | 29000000 | 0.2 | 250000 | 0.2 | 3000000 | 0.22 |
| 13000 | 60 | 90 | 4.09 | 4.5 | 4.5 | 5.875 | 5.875 | 29000000 | 0.2 | 250000 | 0.2 | 3000000 | 0.22 |
| 13500 | 70 | 90 | 4.09 | 4.5 | 4.5 | 5.875 | 5.875 | 29000000 | 0.2 | 250000 | 0.2 | 3000000 | 0.22 |
| 14000 | 80 | 90 | 4.09 | 4.5 | 4.5 | 5.875 | 5.875 | 29000000 | 0.2 | 250000 | 0.2 | 3000000 | 0.22 |
| 14500 | 90 | 90 | 4.09 | 4.5 | 4.5 | 5.875 | 5.875 | 29000000 | 0.2 | 250000 | 0.2 | 3000000 | 0.22 |
| 15000 | 100 | 90 | 4.09 | 4.5 | 4.5 | 5.875 | 5.875 | 29000000 | 0.2 | 250000 | 0.2 | 3000000 | 0.22 |

| MD | Azimuth | Deviation | Sv | Shmin | Shmax | Shmax Azi | PP | Pw_min | Phase Angle_1 | Perf_Azi_1 | Phase Angle_2 | Perf_Azi_2 |
|---|---|---|---|---|---|---|---|---|---|---|---|---|
| ft | degree | degree | psi | psi | psi | degree | psi | psi | degree | degree | degree | degree |
| 10000 | 0 | 10 | 10500 | 2961.54 | 3701.92 | 0 | 5000 | 4364.8 | 0 | 0 | 180 | 180 |
| 10500 | 10 | 20 | 10500 | 2961.54 | 3701.92 | 0 | 5000 | 4901.3 | 167 | 176.2 | 347 | 356.2 |
| 11000 | 20 | 30 | 10500 | 2961.54 | 3701.92 | 0 | 5000 | 5547.1 | 146 | 162.1 | 326 | 342.1 |
| 11500 | 30 | 40 | 10500 | 2961.54 | 3701.92 | 0 | 5000 | 5801.5 | 112 | 137.2 | 292 | 317.2 |
| 12000 | 40 | 50 | 10500 | 2961.54 | 3701.92 | 0 | 5000 | 5705.1 | 101 | 137.1 | 281 | 317.1 |
| 12500 | 50 | 60 | 10500 | 2961.54 | 3701.92 | 0 | 5000 | 5513.5 | 96 | 143 | 276 | 323 |
| 13000 | 60 | 70 | 10500 | 2961.54 | 3701.92 | 0 | 5000 | 5278.3 | 93 | 151 | 273 | 331 |
| 13500 | 70 | 80 | 10500 | 2961.54 | 3701.92 | 0 | 5000 | 5043.6 | 91 | 160.2 | 271 | 340.2 |
| 14000 | 80 | 85 | 10500 | 2961.54 | 3701.92 | 0 | 5000 | 4853.2 | 90 | 170 | 270 | 350 |
| 14500 | 90 | 90 | 10500 | 2961.54 | 3701.92 | 0 | 5000 | 4785.6 | 90 | 180 | 270 | 0 |
| 15000 | 100 | 95 | 10500 | 2961.54 | 3701.92 | 0 | 5000 | 4853.2 | 90 | 190 | 270 | 10 |

METHOD AND SYSTEM TO DETERMINE OPTIMAL PERFORATION ORIENTATION FOR HYDRAULIC FRACTURING SLANT WELLS

TECHNICAL FIELD

The present disclosure describes systems and methods for determining a perforation orientation and, more particularly, determining an optimal perforation orientation for a deviated, cased hole, clustered perforation hydraulic fracturing treatment at a slant well.

BACKGROUND

Hydraulic fracturing has been used to stimulate tight sandstone and shale gas reservoirs. Rock breakdown or fracture initiation is typically required for a successful hydraulic fracturing treatment. For hydraulic fracturing treatments, accurately estimating a breakdown pressure of a subterranean formation may help determine correct selections of casing size, tubing size, and wellhead (for example, to correctly select their respective burst pressure limiting requirements), as well as a pump schedule design. Otherwise, the hydraulic fracturing operation may not properly inject a fracturing liquid to fracture the formation (for example, if the perforation orientation was miscalculated). Generally, hydraulic fracturing simulators do not calculate the optimal perforation orientation and consider the detailed perforation orientations of each perforarion cluster.

SUMMARY

An embodiment described herein determines a perforation orientation of a subterranean formation for a hydraulic fracturing treatment. To determine the perforation orientation of a subterranean formation for a hydraulic fracturing treatment, in-situ stresses are identified for a portion of a wellbore formed from a terranean surface into a subterranean formation. The in-situ stresses are transformed from a global coordinate system to a wellbore coordinate system at a perforation cluster of the wellbore that comprises at least one perforation tunnel for a hydraulic fracturing treatment. The in-situ stresses are transformed from the wellbore coordinate system to a perforation coordinate system through at least one rotation matrix. Pressure coefficients and a breakdown pressure are determined for each trial perforation phase angle at a perforation cluster. A perforation point is calculated in the wellbore coordinate system for each trial perforation phase angle of the perforation cluster. The perforation point is transformed from the wellbore coordinate system to a translated global coordinate system for each trial perforation phase angle. A target perforation phase angle is selected at a minimum breakdown pressure for the perforation cluster. A perforation azimuth and perforation dip is calculated for the perforation cluster at the minimum breakdown pressure for the target perforation phase angles.

BRIEF DESCRIPTION OF DRAWINGS

FIGS. 8A-8F illustrate example output from the computational framework.

DETAILED DESCRIPTION

Embodiments described herein enable calculating optimal perforation orientation for a deviated, cased hole, clustered perforation hydraulic fracturing treatment at a slant well. Hydraulic fracture initiation in deep and tight gas reservoirs often face a high breakdown pressure. Oriented perforation lowers the breakdown pressure and delivers a better fracture orientation geometry. In embodiments, the optimal perforation orientation alleviates near wellbore fracture tortuosity, minimizes flow restriction, and minimizes friction pressure during hydraulic fracturing treatment. Conventional approaches suffer from multiple and reoriented nonplanar fractures originated from the wellbore perforation cluster, which likely leads to a premature screen-out and negatively impact the fluid injection potential to achieve a desired stimulation performance.

Figure 1:
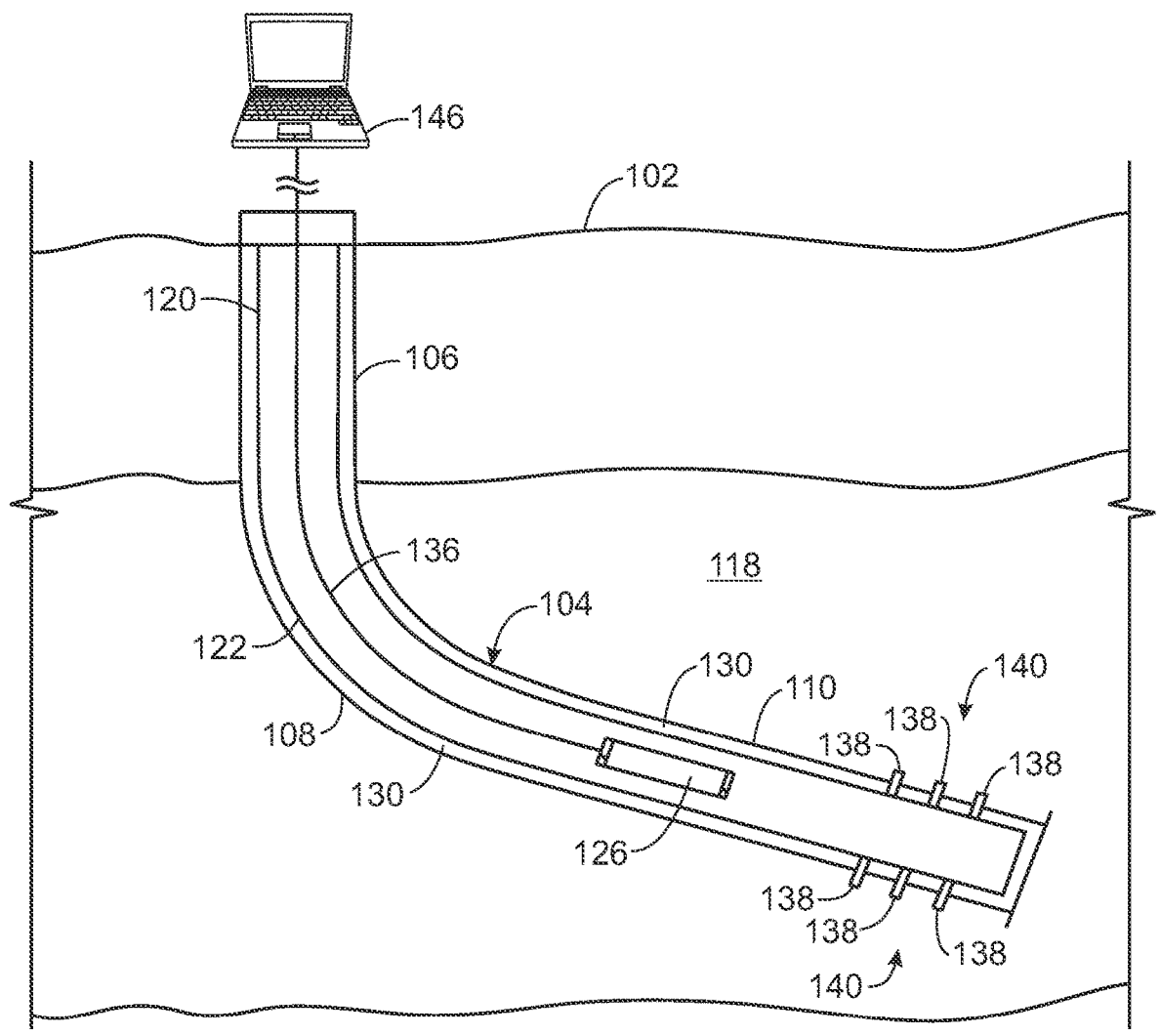
FIG. 1 is a schematic diagram of an example implementation of a wellbore system.

FIG. 1 is a schematic diagram of an example implementation of a wellbore system 100 according to the present disclosure. In some aspects, the wellbore system 100 (all or part of it) may provide a wellbore system and computational framework (for example, embodied in control system 146) for determining optimal perforation orientation for hydraulic fracturing slant wells. In some aspects, the wellbore system 100 (and the computational framework) provides such a determination for a deviated, cased hole, and clustered perforation hydraulic fracturing treatment, while taking into account an impact of casing-cement mechanical properties on the breakdown pressure.

In some aspects, the computational framework (for example, executed on a control system 146) of wellbore system 100 provides for a layout of a series of coordinate system transformations and corresponding rotation matrices, for example, to streamline a stress tensor projection onto different coordinate systems. The computational framework of wellbore system 100 may also account for one or more effects of casing-cement intermediate layers in a deviated wellbore to calculate the breakdown pressure of a subterranean formation. The computational framework of wellbore system 100 may also account for a potential effect of perforation quality on estimating the breakdown pressure of a subterranean formation. The computational framework of wellbore system 100 improves current available models on calculating breakdown pressure, for example, which are applicable to deviated, cased wellbores, and clustered perforation hydraulic fracturing treatments.

In an embodiment, an optimal perforation orientation is an orientation along which hydraulic fracturing is initiated at a minimum breakdown pressure. Once the lowest breakdown pressure for a perforation cluster is obtained, the corresponding perforation phase angle in the wellbore coordinate system can be known and then perforation orientation in the global coordinate system can be calculated thereafter, including a perforation azimuth and perforation dip. The perforation azimuth and perforation dip are calculated based on the lowest breakdown pressure, its corresponding phase angles, and its location at the well trajectory. The optimal perforation orientation (perforation phase angle and perforation azimuth) can be used to control the perforation device. In particular the perforation device is rotated according to the perforation orientation so that a charged gun can be fired at the optimal perforation orientation in the subsurface condition, which enables fracture initiation at a lower breakdown pressure in a slant well.

As illustrated, the wellbore system 100 includes a wellbore 104 formed (for example, drilled or otherwise) from a terranean surface 102 and to and into subterranean formation 118. Although the terranean surface 102 is illustrated as a land surface, terranean surface 102 may be a sub-sea or other underwater surface, such as a lake or an ocean floor or other surface under a body of water. Thus, the present disclosure contemplates that the wellbore 104 may be formed under a body of water from a drilling location on or proximate the body of water.

The illustrated wellbore 104 is a directional wellbore in this example of wellbore system 100. For instance, the wellbore 104 includes a substantially vertical portion 106 coupled to a radiussed or curved portion 108, which in turn is coupled to a substantially slant portion 110. As used in the present disclosure, "substantially" in the context of a wellbore orientation, refers to wellbores that may not be exactly vertical (for example, exactly perpendicular to the terranean surface 102), exactly horizontal (for example, exactly parallel to the terranean surface 102), or exactly slant (for example, exactly at a 45 degree angle with respect to the terranean surface 102). In other words, those of ordinary skill in the drill arts would recognize that vertical wellbores often undulate offset from a true vertical direction that they might be drilled at an angle that deviates from true vertical, and horizontal wellbores often undulate offset from a true horizontal direction. Further, the substantially slant portion 110, in some aspects, may be a slant wellbore or other directional wellbore that is oriented between exactly vertical and exactly horizontal. The substantially slant portion 110, in some aspects, may be oriented to follow a slant of the formation. As illustrated in this example, the three portions of the wellbore 104—the vertical portion 106, the radiussed portion 108, and the slant portion 110—form a continuous wellbore 104 that extends into the Earth. Thus, in this example implementation, at least a portion of the wellbore 104, such as the radiussed portion 108 and the slant portion 110, may be considered a deviated wellbore, in other words, a non-vertical wellbore.

The illustrated wellbore 104 has a surface casing 120 positioned and set around the wellbore 104 from the terranean surface 102 into a particular depth in the Earth. For example, the surface casing 120 may be a relatively large-diameter tubular member (or string of members) set (for example, cemented) around the wellbore 104 in a shallow formation. As used herein, "tubular" may refer to a member that has a circular cross-section, elliptical cross-section, or other shaped cross-section. As illustrated, a production casing 122 is positioned and set within the wellbore 104 downhole of the surface casing 120. Although termed a "production" casing, in this example, the casing 122 may or may not have been subject to hydrocarbon production operations. Thus, the casing 122 refers to and includes any form of tubular member that is set (for example, cemented) in the wellbore 104 downhole of the surface casing 120. In some examples of the wellbore system 100, the production casing 122 may begin at an end of the radiussed portion 108 and extend throughout the substantially slant portion 110. The casing 122 could also extend into the radiussed portion 108 and into the vertical portion 106.

As shown, cement 130 is positioned (for example, pumped) around the casings 120 and 122 in an annulus between the casings 120 and 122 and the wellbore 104. The cement 130, for example, may secure the casings 120 and 122 (and any other casings or liners of the wellbore 104) through the subterranean layers under the terranean surface 102. In some aspects, the cement 130 may be installed along the entire length of the casings (for example, casings 120 and 122 and any other casings), or the cement 130 could be used along certain portions of the casings if adequate for the particular wellbore 104. Other casings, such as conductor casings or intermediate casings, are also contemplated by the present disclosure for the wellbore system 100.

As illustrated, the wellbore 104 extends through one or more subterranean layers (not specifically labeled) and lands in subterranean formation 118. The subterranean formation 118, in this example, may be chosen as the landing for the substantially slant portion 110, for example, in order to initiate completion operations such as hydraulic fracturing operations and ultimately recover hydrocarbon fluids from the subterranean formation. In some examples, the subterranean formation 118 includes slanted layers, and the substantially slant portion 110 follows the slant of the subterranean formation 118. In some examples, the subterranean formation 118 is composed of shale or tight sandstone. Shale, in some examples, may be source rocks that provide for hydrocarbon recovery from the subterranean formation 118.

As shown in FIG. 1, the wellbore system 100 includes one or more perforation tunnels 138 (also known as perforations 138) that are formed from the wellbore 104, through the casing 122 and the cement 130, and extend into the subterranean formation 118. Generally, the perforation tunnels 138 may be formed by, for example, a firing a charged gun, shaped explosive charges, water jetting, laser, or other conventional perforating techniques. In some aspects, multiple perforation tunnels 138 may comprise a perforation stage 140. In embodiments, the optimal perforation orientation is located within the perforation stage 140. Each perforation tunnel 138, as well as each perforation cluster 140, may provide a path (or paths) for a hydraulic fracturing liquid (with or without proppant) to enter the subterranean formation 118 from the wellbore 104 in order to initiate and propagate hydraulic fractures (extending from the perforation tunnels 138) through the subterranean formation 118.

As shown in FIG. 1, the example implementation of the wellbore system 100 also includes a logging tool 126 that is communicably coupled to a downhole conveyance 136, such as a wirelines, optical line, or other data communication cable. The downhole conveyance 136 provides data from the logging tool 126 to the control system 146, for real time (for example, during logging operations) or later usage in determining an optimal perforation orientation for hydraulic fracturing slant wells of the subterranean formation 118. In some aspects, the control system 148 comprises a microprocessor based control system that includes, for example, one or more hardware processors, one or more memory storage devices (for example, tangible, non-transitory computer-readable memory modules), one or more network interfaces, and one or more input/output devices, including, for example, a graphical user interface (GUI) to present one or more determinations or data from the computer framework for determining an optimal perforation orientation for hydraulic fracturing slant wells.

Figure 2:
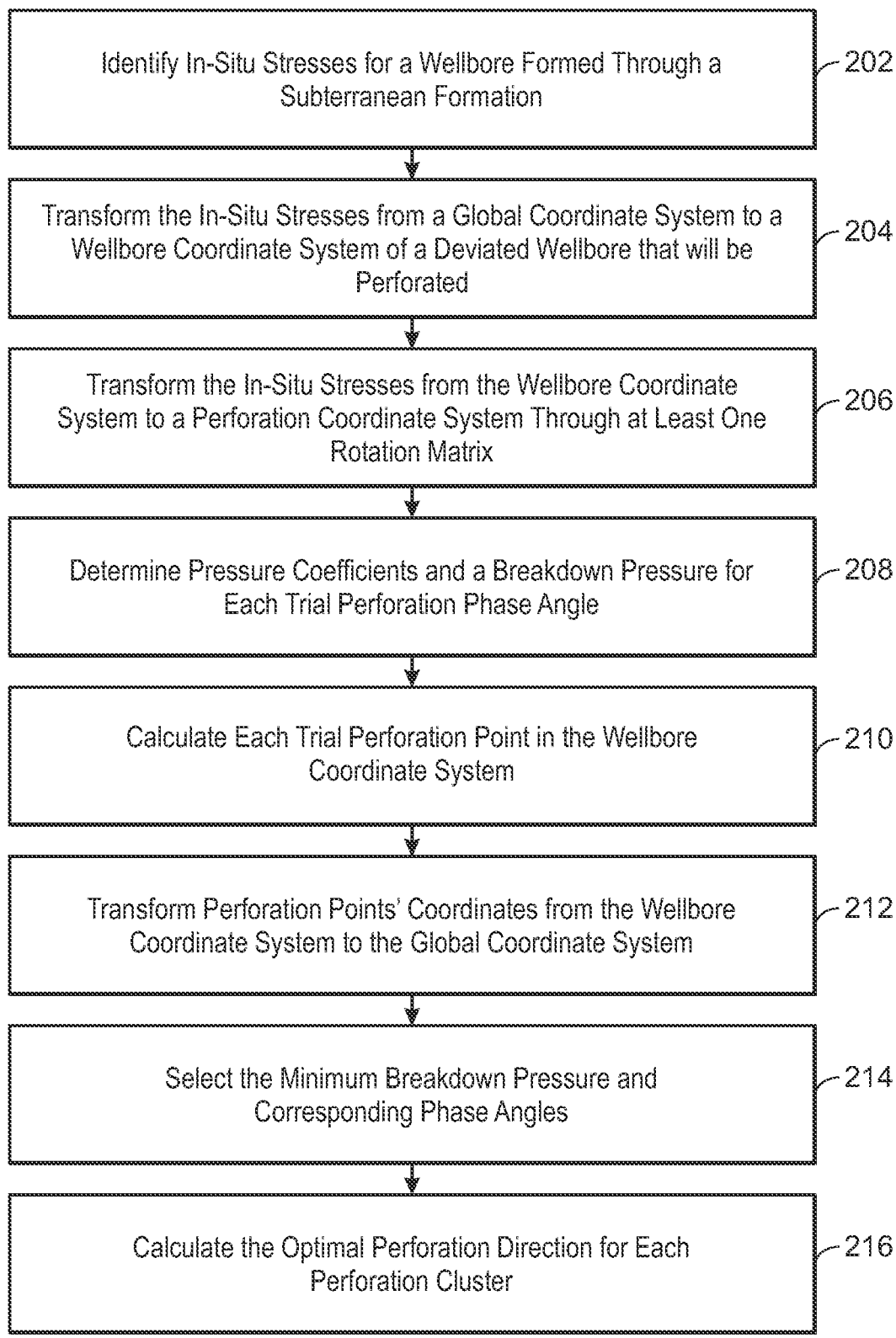
FIG. 2 illustrates a flowchart that describes an example process for determining an optimal perforation orientation for hydraulic fracturing slant wells.

FIG. 2 illustrates a flowchart that describes an example method 200 for determining an optimal perforation orientation for hydraulic fracturing slant wells according to the present disclosure. In some aspects, method 200 may be performed with or by all or parts of the wellbore system 100, including the control system 146 that is communicably coupled to receive, for example, logging data about the subterranean formation 118 from the logging tool 126.

In some aspects, method 200 is part of a computational framework executed by, for instance, the control system 146, in order to determining an optimal perforation orientation for hydraulic fracturing slant wells in the subterranean formation 118 through which the wellbore 104 (for example, as a cased, cemented, deviated wellbore) is formed. For example, such conventional simulators may typically model hydraulic fractures that initiate from perforation clusters and propagate along a maximum principal stress directions of the subterranean formation as long as hydraulic fracturing fluid injection is maintained. Generally hydraulic fracturing simulators do not calculate optimal perforation orientation. A few conventional models are only applicable to vertical (in other words, non-deviated), open hole (in other words, without casing and cement) wellbores. The computational framework for determining optimal perforation orientations for hydraulic fracturing treatment of slant wells according to the present disclosure, however, is applicable to deviated, cased wellbores with clustered perforations so as to determine optimal perforation orientations to guide and inform hydraulic fracturing treatments.

Method 200 may begin at step 202, which includes identifying in-situ stresses for a wellbore formed through a subterranean formation. For example, in some aspects, the logging tool 126 may derive or generate an image log of the subterranean formation 118, from which the maximum horizontal stress direction of the subterranean formation 118 can be obtained. From the maximum horizontal stress direction and borehole image, a maximum horizontal stress of the subterranean formation 118 can be estimated and in-situ stresses may be calibrated and finally determined.

In some aspects, the in-situ stresses can be calculated according to a number of parameters. For example, such parameters may include the image log, which includes wellbore true vertical depth (TVD), azimuth, and deviation. The parameters may also include stress orientations. Moreover, the parameters may also include the mechanical properties of, for example, the casing 122, the cement 130, and the subterranean formation 118 itself.

Figure 3:
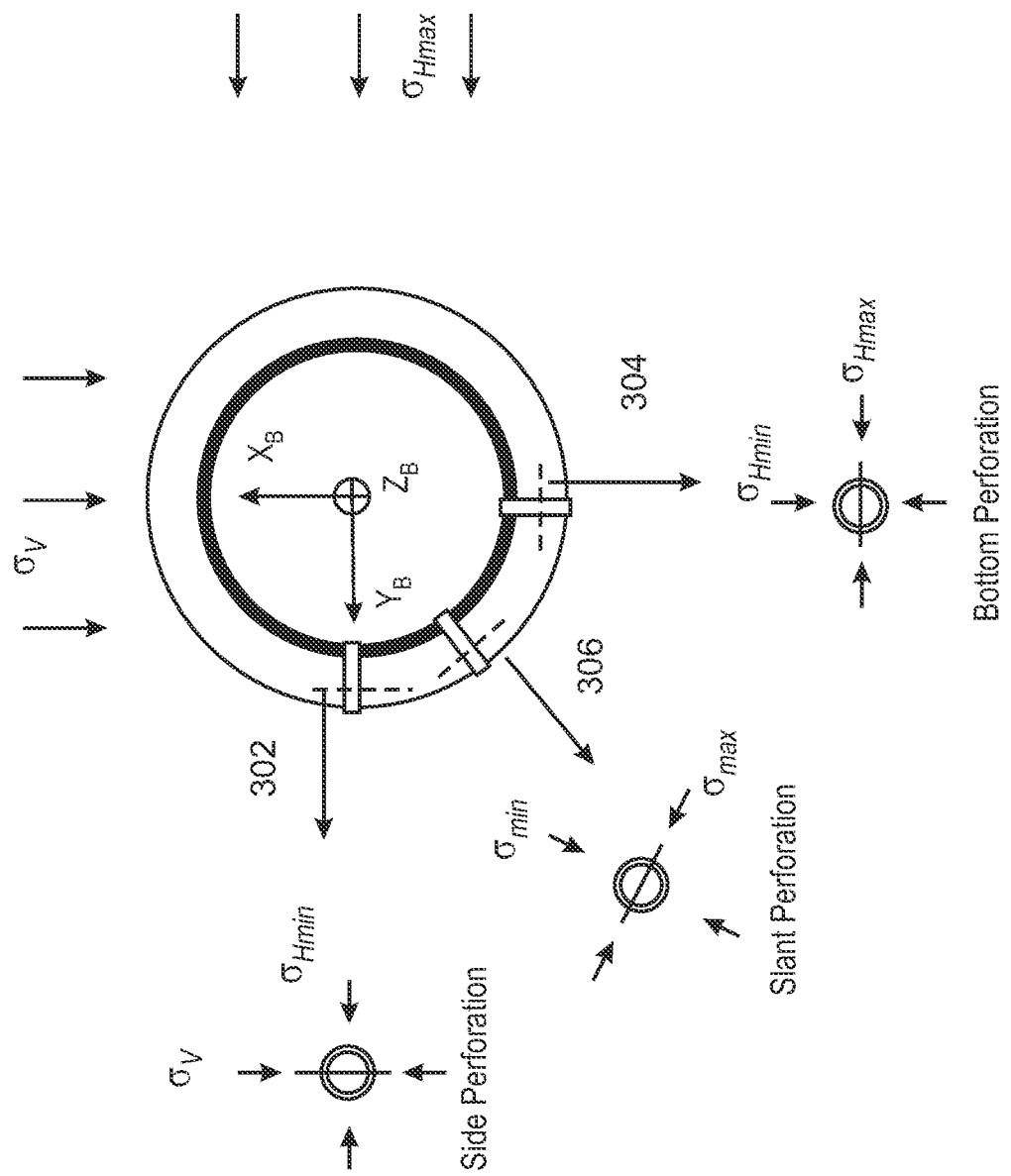
FIG. 3 is an illustration of stresses associated with orienting perforation for a horizontal well.

For example, FIG. 3 is an illustration of stresses associated with orienting perforation for a horizontal well. For horizontal wells generally drilled at the minimum horizontal stress direction ($\sigma_{Hmin}$), generally hydraulic fractures will propagate towards the maximum horizontal stress direction ($\sigma_{Hmax}$) once fracture successfully initiates from the near wellbore. In the example of FIG. 3, a cross section 300 of a horizontal well drilled at the direction of minimum horizontal stress ($\sigma_{Hmin}$), with three perforations is illustrated. The stress regime is strike slip, which has a minimum horizontal stress less than the vertical stress, which is less than the maximum horizontal stress, or $\sigma_{Hmin} < \sigma_V < \sigma_{Hmax}$. In the example of FIG. 3, perforations occur at a horizontal direction (horizontal perforation 302), vertical direction (vertical perforation 304), and slant direction (slant perforation 306) as indicated by the associated arrows. In FIG. 3, for each perforation a perforation cross section corresponding to each dashed line is plotted nearby.

As illustrated, the horizontal perforation 302 aligns at the direction of maximum horizontal stress. The vertical perforation 304 is illustrated at the bottom of the cross section 300. In embodiments, perforating vertical or horizontal wells can easily initiate fracture oriented at the direction of maximum horizontal stress. Both the fracture planes initiating from the side perforation (e.g., horizontal perforation 302) and bottom perforation (e.g., vertical perforation 304) will develop a fracture plane orienting at the same direction of maximum horizontal stress. However, for deviated, cased hole and clustered perforation hydraulic fracturing treatment, the determination of optimal perforation orientation should be calculated as accurately as possible. The present techniques enable an accurate determination of the optimal perforation orientation. The optimal perforation orientation at perforation clusters is defined as the orientations (e.g., phase angle and perforation azimuth) that initiate hydraulic fracture at the lowest breakdown pressure compared to the perforation direction. Hydraulic fractures can initiate early and fast along the optimal perforation direction, which can lessen a near wellbore fracture tortuosity and consequently reduces the chance of premature screen out. To determine the optimal perforation angle, the lowest breakdown pressure for deviated, cased hole and clustered perforation is first determined, which can account for the casing-cement-rock interaction effect and perforation quality. In embodiments, stochastic properties of the wellbore can be used to predict the breakdown pressure if the statistical distributions are known. Based on the lowest breakdown pressure and its corresponding phase angle, an oriented perforation azimuth and perforation dip can be subsequently calculated. As used herein, a perforation dip is the angle between the inclined perforation tunnel and the horizontal plane.

Accordingly, to find the lowest breakdown pressure, in-situ stresses are analyzed. For example, an in-situ stress field of the subterranean formation 118 exists in the far field, with $\sigma_{Hmax}$ and $\sigma_{Hmin}$ being the maximum and minimum horizontal stresses respectively, and $\sigma_V$ is the principal vertical stress component. A dynamic Young's modulus and Poisson's ratio can be calculated using, for example, a sonic log from the logging tool 126, then converted to a static modulus based on correlations. A vertical stress $S_V$ (total stress) or $\sigma_V$ (effective stress) can be reasonably calculated based on, for example, a density log of the logging tool 126.

Without considering tectonic stresses, the effective and total minimum horizontal stress can be approximately calculated. A maximum principal stress can be estimated by calibrating the maximum horizontal stress magnitude against a drilling fluid ("mud") weight to match the observed breakout and breakdown zone indicated in the image log data.

Drilling the wellbore 104 in and through the subterranean formation 118 leads to a stress redistribution around the wellbore 104. The wellbore 104 is generally supported by drilling fluid pressure acting on the wellbore wall. Accurately estimating the stresses around the wellbore 104 may be necessary for wellbore stability. Also, it may be helpful to determine the breakdown pressure for hydraulic fracturing design, which directly impacts the selection of casing size, treatment tubing size, wellhead, steel grade, pump schedule, and other equipment. For hydraulic fracturing, tensile failure criteria is generally used to direct the fracture propagation trajectory therefore a fracture propagates at the direction of maximum horizontal stress. In embodiments, the breakdown pressure is determined based on tensile failure. If the hoop stress turns into tension around perforation tunnel and exceeds the rock tensile strength T, formation will fail in tensile mode.

Figure 4:
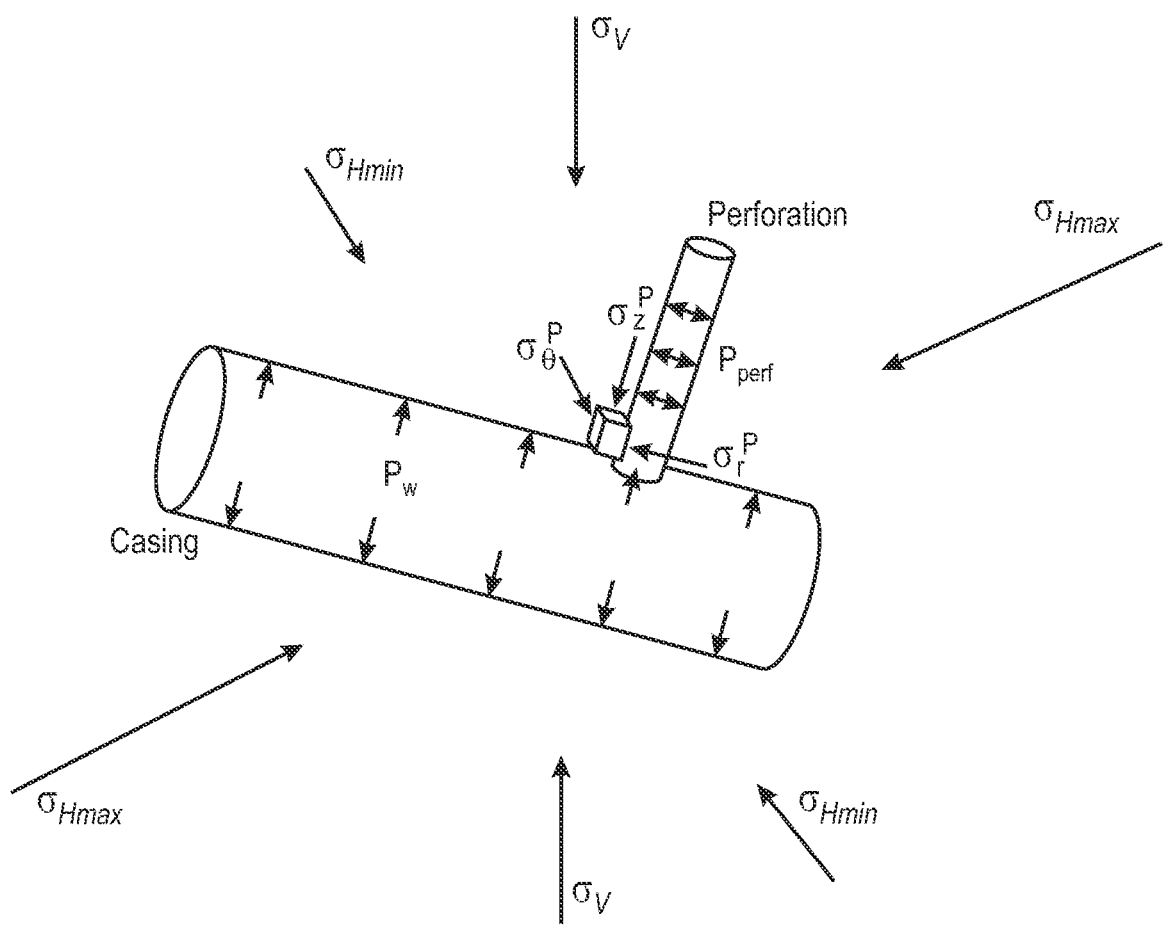
FIG. 4 is an illustration of loads and induced stresses around the perforation tunnel wall.

For a cased and cemented wellbore with perforation clusters (such as wellbore 104), the breakdown pressure refers to the bottom hole pressure inside the casing that leads to tensile failure around the area of the wellbore-perforation interface. FIG. 4 is an illustration of loads and induced stresses around the perforation tunnel wall. In some aspects of the computational framework of method 200 (and step 204), the deformation is limited to linear elasticity. Thus, the total stresses can be summed once the corresponding stresses induced by each load are calculated. For example, FIG. 4 illustrates schematic isometric view 400 of a portion of the wellbore 104 with a particular perforation tunnel 138 and particular stresses and acting pressures. More specifically, view 400 shows the pressure loads that may be included to estimate the induced stresses around the area of wellbore-perforation interface.

The loads and induced stresses around a perforation tunnel wall may be used to determine an optimal perforation orientation for hydraulic fracturing slant wells via a computational framework to calculate the breakdown pressure for perforation cluster, which is applicable to deviated, cased hole and clustered perforations. In the example of FIG. 4, the loads, which should be included to estimate the induced stresses around the wellbore-perforation interface for breakdown issue are illustrated. First, the stresses around the perforation are induced by the far-field in-situ stress tensor. Second, the borehole bottom hole pressure $P_w$ can be partially and radially transferred to the rock through casing and cement, which generates additional stresses over the wellbore-perforation interface as illustrated in FIG. 4. Injecting fluids flows into the perforation tunnel from casing and maintains pressure $P_{perf}$ acting on the perforation wall, which generates tensile hoop stress around the wellbore-perforation interface. It is the driving force to initiate longitudinal fracture along the perforation tunnel for a breakdown so that hydraulic fracture initiates. However, the fluid pressure inside the perforation tunnel might be less than the downhole pressure $P_w$ inside the casing if the perforation friction is not negligible. The resulting induced stresses around perforations by these loads are denoted by superscript as $\sigma_\theta^P$, $\sigma_z^P$, and $\sigma_r^P$. The breakdown pressure is estimated based on the stress state around the wellbore-perforation interface. From mechanics point of view, the breakdown pressure of perforation is a three dimensional mechanics problem. In embodiments, an analytical approach to search the minimum breakdown pressure is achieved by iterating from 0° to 360° using an increment for each perforation cluster. Based on the lowest breakdown pressure and the corresponding phase angles, the oriented perforation orientation can be subsequently calculated through coordinate system transformation.

Method 200 may continue at step 204, which includes transforming the in-situ stresses from a global coordinate system to a wellbore coordinate system of a deviated wellbore that will be perforated. In some aspects, step 204 may also include calculating a coefficient of pressure transferred, for example, from a hydraulic fracturing fluid to the subterranean formation 118 through the casing 122 and cement 130 as well as pressure loss due to perforation friction.

Figure 5:
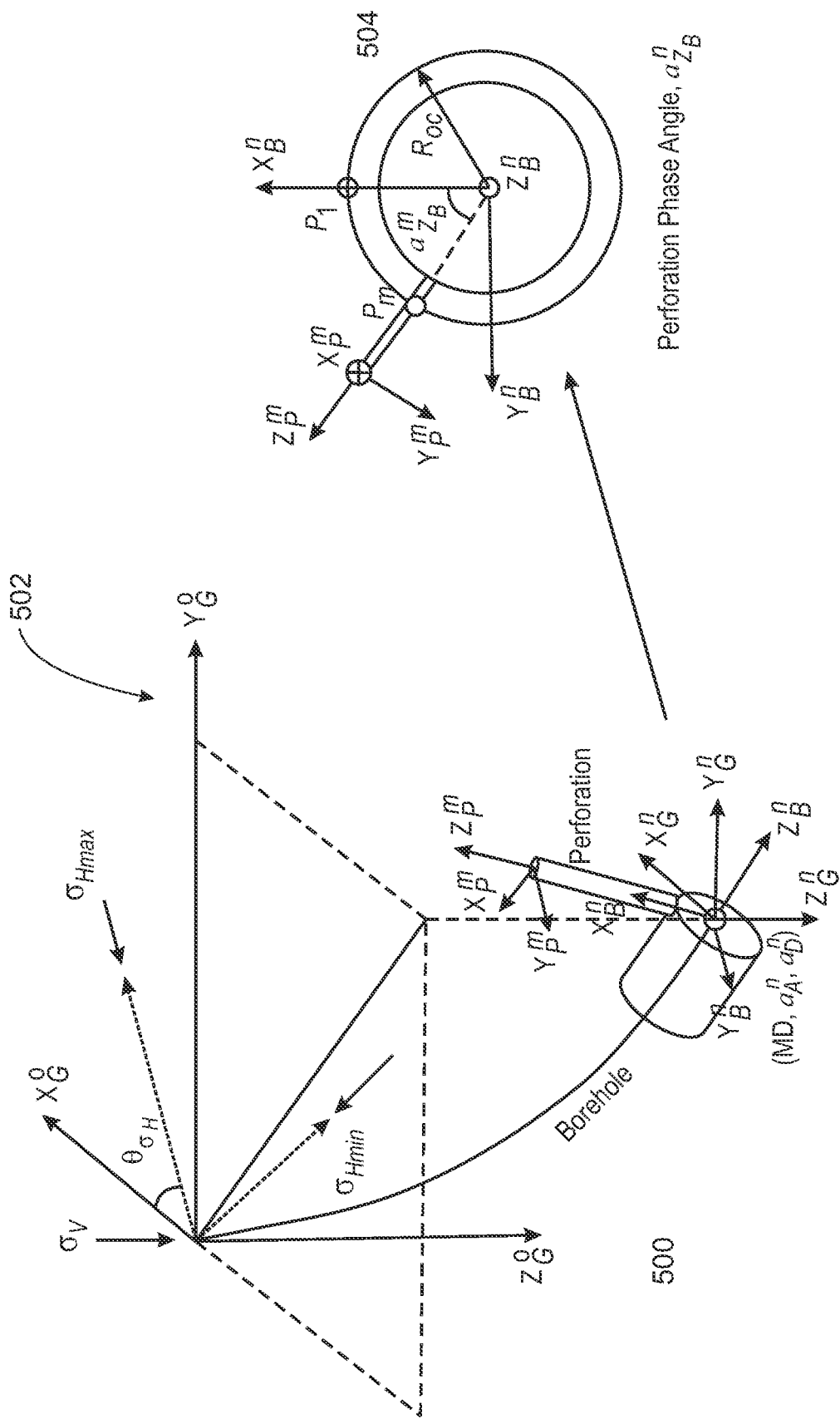
FIG. 5 illustrates a schematic side view 500 of a wellbore that includes at least one perforation tunnel with overlaid coordinate systems.

For example, for a deviated wellbore such as wellbore 104, the in-situ stresses may be transformed between different coordinate systems. For example, the in-situ stresses may be transformed from a global coordinate system to a wellbore coordinate system. FIG. 5 illustrates a schematic side view 500 of the wellbore 104 that includes at least one perforation tunnel 138 with overlaid coordinate systems. In the example of FIG. 5, coordinate systems used for transforming in-situ stresses from a global coordinate system to perforation coordinate systems are illustrated.

In the global coordinate system 502, as shown in FIG. 5, the x-axis aligns with north (true north), the y-axis aligns with east, and the z-axis is vertically downward (for example, into the Earth). This coordinate system 502 is denoted by global coordinate system $x_G y_G z_G$. For deviated well, cased hole and clustered perforation hydraulic fracturing treatment, the breakdown pressure calculation is much complex than open vertical hole. As discussed above, to predict the breakdown pressure, the far field in-situ stresses are transformed from the global coordinate system to the local coordinate system attached to the individual perforation as illustrated in FIG. 5. As shown in FIG. 5, a first global coordinate system-$x_G^0 y_G^0 z_G^0$ starting at the measured depth of zero is illustrated. In this framework, the global coordinate system is defined as the x-axis always aligning with the North (truth north), the y-axis aligning with the East, and therefore the z-axis is vertically downward (for example, into the Earth. For well survey, any point along the well trajectory can be determined by three parameters: MD (measured depth), $\alpha_D^n$ (wellbore deviation), and $\alpha_A^n$ (wellbore azimuth). At each measured depth along the deviated wellbore, a series of global coordinate system $x_G^n y_G^n z_G^n$ (translated from the first global coordinate system $x_G^0 y_G^0 z_G^0$ but without any rotations), borehole coordinate system $x_B^n y_B^n z_B^n$ considering the wellbore deviation and azimuth, and perforation coordinate system $x_P^m y_P^m z_P^m$ considering perforation phase angle are combined. In the example of FIG. 5, the borehole coordinate system $x_B^n y_B^n z_B^n$ considering the wellbore deviation and azimuth, and perforation coordinate system $x_P^m y_P^m z_P^m$ considering perforation phase angle are illustrated at reference number 504.

The wellbore coordinate system at any point along the well trajectory can be tracked and obtained by the following rotations about the global coordinate system $x_G y_G z_G$ particularly following two steps: (1) rotation of deviation $\alpha_D$ about the $y_G$-axis; and (2) rotation of azimuth $\alpha_A$ about $z_G$-axis. Then the transformation matrix is given by:

$$R_{G \to B}^n(\alpha_A^n, \alpha_D^n) = \qquad (1)$$
$$R_y(\alpha_D^n) R_z(\alpha_A^n) = \begin{bmatrix} \cos\alpha_D^n & 0 & -\sin\alpha_D^n \\ 0 & 1 & 0 \\ \sin\alpha_D^n & 0 & \cos\alpha_D^n \end{bmatrix} \begin{bmatrix} \cos\alpha_A^n & \sin\alpha_A^n & 0 \\ -\sin\alpha_A^n & \cos\alpha_A^n & 0 \\ 0 & 0 & 1 \end{bmatrix}$$

And leads to the following:

$$R_{G \to B}^n(\alpha_A^n, \alpha_D^n) = \begin{bmatrix} \cos\alpha_D^n \cos\alpha_A^n & \cos\alpha_D \sin\alpha_A^n & -\sin\alpha_D^n \\ -\sin\alpha_A^n & \cos\alpha_A^n & 0 \\ \sin\alpha_D^n \cos\alpha_A^n & \sin\alpha_D^n \sin\alpha_A^n & \cos\alpha_D^n \end{bmatrix} \qquad (2)$$

Also note that the point of $P_1$ is always at the highest point of the wellbore cross section and will not change even following rotations of deviation af about the $y_G^n$-axis; and rotation of azimuth $\alpha_A^n$ about $z_G^n$-axis.

Thus, at the culmination of step 204, the in-situ stresses are transformed from a global coordinate system to a wellbore coordinate system.

Referring again to FIG. 2, method 200 may continue at step 206, which includes transforming the in-situ stresses from the wellbore coordinate system to a perforation coordinate system through at least one rotation matrix. Generally, the perforation direction is perpendicular to the wellbore axis and perforated at the radial direction of borehole. Therefore, the rotation matrix from the wellbore coordinate system to the first perforation coordinate system can be obtained by a rotation of $\alpha_{y_B}^n$ about the axis—$y_B^n$ of the wellbore coordinate system as follows:

$$R(\alpha_{y_B}^m) = \begin{bmatrix} \cos\alpha_{y_B}^m & 0 & -\sin\alpha_{y_B}^m \\ 0 & 1 & 0 \\ \sin\alpha_{y_B}^m & 0 & \cos\alpha_{y_B}^m \end{bmatrix} \quad (3)$$

Therefore rotating the axis—y of the wellbore coordinate system at any point by $\alpha_{y_B}^1 = \pi/2$, yields a first perforation coordinate system and the corresponding rotation matrix as:

$$R_{B\to P}^1\left(\alpha_{y_B}^1 = \frac{\pi}{2}\right) = \begin{bmatrix} 0 & 0 & -1 \\ 0 & 1 & 0 \\ 1 & 0 & 0 \end{bmatrix} \quad (4)$$

The coordinate system for different phase angle perforations can be rotated by two steps: (1) rotating $\alpha_{y_B}^1 = \pi/2$ about the $y_B^n$-axis of the wellbore coordinate system; and (2) rotation of phase angle $\alpha_{z_B}^n$ about the $z_B^n$-axis of the wellbore coordinate system. For clustered perforations with known perforation phase angle, the rotation matrix from wellbore coordinate system $x_B^n y_B^n z_B^n$ to the perforation coordinate system $x_P^n y_P^n z_P^n$ can be sequentially obtained by:

$$R_{B\to P}^m(\alpha_{z_B}^m, \alpha_{y_B}^m) = R_{B\to P}^1 R_{z,B}(\alpha_{z_B}^m) = \begin{bmatrix} 0 & 0 & -1 \\ \sin\alpha_{z_B}^m & \cos\alpha_{z_B}^m & 0 \\ \cos\alpha_{z_B}^m & \sin\alpha_{z_B}^m & 0 \end{bmatrix} \quad (5)$$

Therefore the final rotation matrix from the global coordinate system to the individual perforation coordinate system can be given by:

$$R_{G\to P} = R_{G\to B}^n(\alpha_A^n, \alpha_D^n) R_{B\to P}^m(\alpha_{z_B}^m, \alpha_{y_B}^m) = \begin{bmatrix} R_{GP}^{11} & R_{GP}^{12} & R_{GP}^{13} \\ R_{GP}^{21} & R_{GP}^{22} & R_{GP}^{23} \\ R_{GP}^{31} & R_{GP}^{32} & R_{GP}^{33} \end{bmatrix} \quad (6)$$

Where, $\alpha_{z_B}^m$ is the perforation phase angle rotating about the wellbore axis-z starting from the highest point, which ranges from 0° to 360°. In embodiments, pressure coefficients and a breakdown pressure are determined for each trial perforation orientation.

Figure 6:
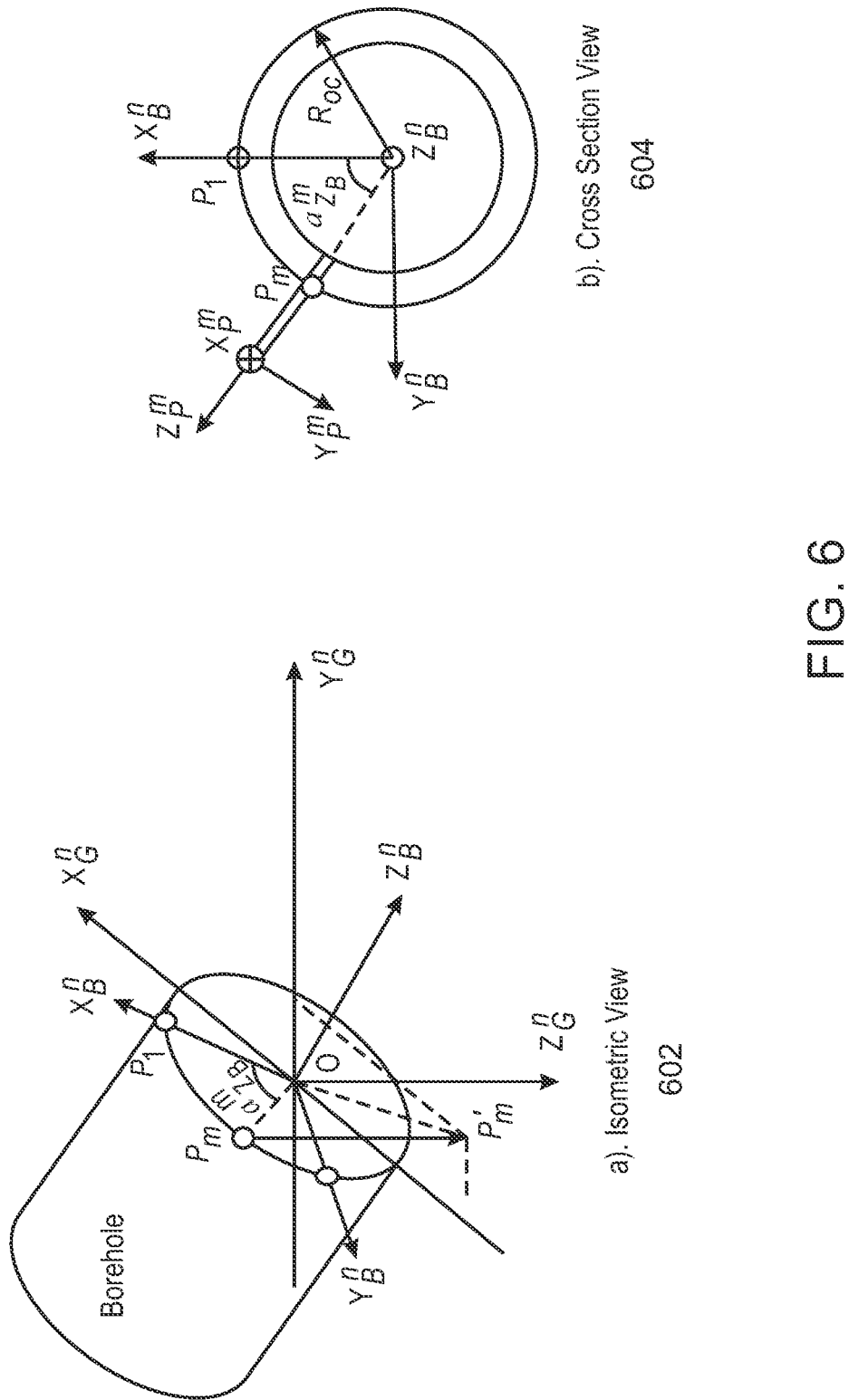
FIG. 6 is an illustration of an isometric view and a cross section view of a projection of wellbore perforation intersection point on the translated global coordinate system.

FIG. 6 is an illustration of an isometric view 602 and a cross section view 604 of a projection of wellbore perforation intersection point on the translated global coordinate system. The coordinate system as described herein should be used for stress tensor transformation and calculating breakdown pressure. The coordinate systems will also be used to calculate the perforation orientation. Once the lowest breakdown pressure from a perforation cluster is identified, the corresponding perforation phase angle $\alpha_{z,B}^m$ will be the optimal perforation angle with respect to the wellbore coordinate system. In embodiments, for arbitrarily deviated well, the perforation phase angle might be difficult to use to when implemented via oriented perforation. Accordingly, the present techniques calculate the perforation orientation (include perforation azimuth and perforation dip) for oriented perforation.

Referring again to FIG. 2, method 200 may continue at step 208, which includes determining, with one or more hardware processors, pressure coefficients and a breakdown pressure for each trial perforation phase angle. Based on the developed formulation of breakdown pressure, the minimum breakdown pressure and its corresponding phase angle $\alpha_{z_B}^m$ is obtained as illustrated in FIG. 6. Also note that perforation at the angles of $\alpha_{z_B}^m$ and $\alpha_{z_B}^m + 180°$ require the same amount of breakdown pressure. Therefore, the perforation angle $\alpha_{z_B}^m$ can be obtained by calculating breakdown pressure ranging from 0° to 360°. Once the lowest breakdown pressure is calculated for each perforation cluster, the corresponding phase angle $\alpha_{z_B}^m$ can be obtained. This perforation phase angle is used to calculate perforation azimuth and perforation dip.

Referring again to FIG. 2, method 200 may continue at step 210, which includes calculating a perforation point in the wellbore coordinate system. For this purpose, the azimuth of the perforation tunnel with minimum breakdown pressure is calculated, which can be used for orienting perforation in downhole operation. $P_m$ is used to denote the intersection point of perforation and wellbore. The coordinate of point $P_m$ in wellbore coordinate system can be can be calculated as follows:

$$P_m = \begin{cases} x_B^{P_m} = R_{oc}\cos\alpha_{z_B}^m \\ y_B^{P_m} = R_{oc}\sin\alpha_{z_B}^m \\ z_B^{P_m} = 0 \end{cases} \quad (7)$$

where $R_{oc}$ is the radius of the cement. The magnitude of $R_{oc}$ does not impact the perforation orientation calculation.

Referring again to FIG. 2, method 200 may continue at step 212, which includes transforming the perforation points' coordinates from the wellbore coordinate system to the global coordinate system. In embodiments, the transformation determines the perforation point coordinate in the global coordinate system, which is used for perforation direction calculation. The optimal perforation orientation is calculated with respect to the global coordinate system. The coordinate of $P_m$ in wellbore coordinate system and global coordinate system is transformed by:

$$\begin{Bmatrix} x_B^{P_m} \\ y_B^{P_m} \\ z_B^{P_m} \end{Bmatrix} = \begin{bmatrix} \cos\alpha_D^n\cos\alpha_A^n & \cos\alpha_D\sin\alpha_A^n & -\sin\alpha_D^n \\ -\sin\alpha_A^n & \cos\alpha_A^n & 0 \\ \sin\alpha_D^n\cos\alpha_A^n & \sin\alpha_D^n\sin\alpha_A^n & \cos\alpha_D^n \end{bmatrix} \begin{Bmatrix} x_G^{P_m} \\ y_G^{P_m} \\ z_G^{P_m} \end{Bmatrix} \quad (8)$$

Therefore, the coordinate of $P_m$ in the translated global coordinate system at each perforation cluster can be obtained by:

$$\begin{Bmatrix} x_G^{P_m} \\ y_G^{P_m} \\ z_G^{P_m} \end{Bmatrix} = \begin{bmatrix} \cos\alpha_D^n\cos\alpha_A^n & \cos\alpha_D\sin\alpha_A^n & -\sin\alpha_D^n \\ -\sin\alpha_A^n & \cos\alpha_A^n & 0 \\ \sin\alpha_D^n\cos\alpha_A^n & \sin\alpha_D^n\sin\alpha_A^n & \cos\alpha_D^n \end{bmatrix}^{-1} \begin{Bmatrix} x_B^{P_m} \\ y_B^{P_m} \\ z_B^{P_m} \end{Bmatrix} \quad (9)$$

In embodiments, the inverse of rotation matrix might be difficult to obtain analytically and can be calculated by a numerical method.

Referring again to FIG. 2, method 200 may continue at step 214 which includes selecting the minimum breakdown pressure and corresponding phase angles. As discussed above, the angles of $\alpha_{z_B}^m$ and $\alpha_{z_B}^m + 180°$ require the same amount of breakdown pressure. In embodiments, the minimum breakdown pressure is selected (and two phase angles give the minimum breakdown pressure), and a corresponding phase angle is the targeted perforation phase angle for the calculated perforation point. Once the coordinate of point $P_m$ in the translated global coordinate system is obtained, the vectors of $\overrightarrow{OP_m}$ and $\overrightarrow{OP_m'}$ can be expressed by:

$$\overrightarrow{OP_m} = x_G^{P_m} i + y_G^{P_m} j + z_G^{P_m} k \quad (10)$$

$$\overrightarrow{OP_m'} = x_G^{P_m} i + y_G^{P_m} j \quad (11)$$

Referring again to FIG. 2, method 200 continues at step 216 which includes calculating an optimal perforation azimuth and perforation dip for each perforation cluster. The azimuth of the perforation which requires the least breakdown pressure is the angle rotating clockwise from axis-$x_G^n$ to the vector $\overrightarrow{OP_m'}$, which is equivalent to the angle between unit vector i and vector $\overrightarrow{OP_m'}$ in the translated global coordinate system $x_G^n y_G^n z_G^n$. Therefore the perforation azimuth and perforation dip can be calculated by:

$$\cos(\text{Perf\_AZI}) = \frac{i \cdot \overrightarrow{OP_m'}}{\|\overrightarrow{OP_m}\|\|\overrightarrow{OP_m'}\|} \quad (12)$$

$$\cos(\text{Perf\_Dip}) = \frac{\overrightarrow{OP_m'} \cdot \overrightarrow{OP_m}}{\|\overrightarrow{OP_m}\|\|\overrightarrow{OP_m'}\|} \quad (13)$$

As a result, the calculated perforation phase angles and corresponding perforation azimuth and perforation dip enables oriented perforation in slant wells that lowers the breakdown pressure and delivers a better fracture orientation geometry when the perforation layout is well oriented. In embodiments, the optimal perforation orientation alleviates near wellbore fracture tortuosity, minimizes flow restriction, and minimizes friction pressure during hydraulic fracturing treatment.

Figure 7:
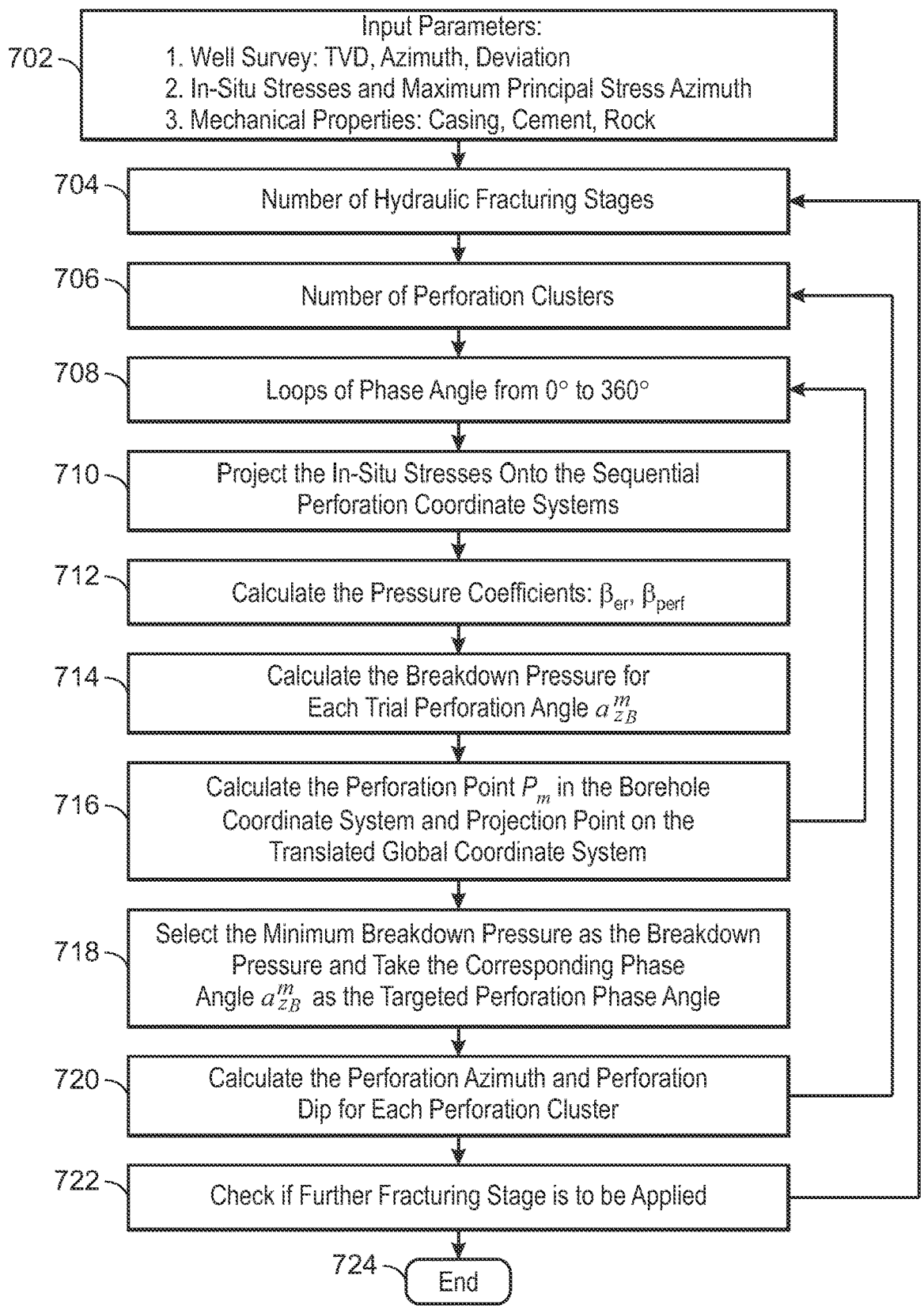
FIG. 7 is a process flow diagram for calculating optimal perforation orientation for perforation clusters.

FIG. 7 is a process flow diagram of a process 700 for calculating an azimuth and dip to orient perforations. In the exemplary process 700, a workflow for predicting the azimuth of oriented perforation based on a breakdown pressure of slant well hydraulically fractured with clustered perforation is provided. The whole workflow can be integrated with geoscience software. It not only calculates the breakdown pressure for each perforation cluster, but also calculates the perforation azimuth of the corresponding phase angle $\alpha_{z_B}^m$ for oriented perforation as well as perforation dip.

At block 702, input parameters are provided. Input parameters include a well survey, in-situ stresses and maximum principle stress azimuth, and mechanical properties. The well survey includes TVD, azimuth, and deviation. Mechanical properties include cases, cement, and rock.

At block 704, a number of hydraulic fracturing stages is determined.

At block 706, a number of perforation clusters is determined.

At block 708, loops of phase angles from 0 to 360 degrees is determined.

At block 710, the in-situ stresses are projected onto the sequential perforation coordinate systems. At block 712, the pressure coefficients are calculated. At block 714, the breakdown pressure is calculated for each trial perforation phase angle. At block 716, a perforation point is calculated in the borehole coordinate system and projection point on the translated global coordinate system at the perforation location. Process flow continues to the next phase angle at block 708 until no more trial perforation phase angles remain.

At block 718, a minimum breakdown pressure is selected and the corresponding perforation phase angle is taken as the targeted perforation phase angle. At block 720, the perforation azimuth and perforation dip are calculated for the current perforation cluster. Process flow returns to block 706 for the next perforation cluster until no perforation clusters remain.

At block 722, it is determined if any further fracturing stages are to be applied. If further fracturing stages are to be applied, process flow returns to block 704 for the next hydraulic stage. Otherwise, the process flow ends at block 724.

An example output from the computational framework is shown in FIGS. 8A-8F. Tables 800, 810, 820, 830, 840, and 850 show output data from the computational framework of process 200 of FIG. 2 or process 700 of FIG. 7 for an example cased, deviated wellbore with perforation clusters. In the example of FIGS. 8A-8F, three case studies are illustrated to demonstrate the model performance and how to apply the method in engineering practice. Table 800 shows the well trajectory, ID and OD of casing and cement, and mechanical properties of casing, cement and rock. In the case study here, we assume the maximum horizontal stress angle (azimuth) is 0°. But for each case, the well trajectory has different well azimuth and deviation along the wellbore trajectory. All the rest parameters related to casing, cement, and formation are same for all the three cases.

In examples, table 800 shows the well trajectory, inner diameter (ID) and outer diameter (OD) of casing and cement, and the mechanical properties (such as Young's modulus (YM) and Poisson's ratio (PR)) of the casing, the cement, and the formation (all be measured depth (MD)). Table 810 lists the predicted phase angle and perforation azimuth for minimum breakdown pressure for case 1. Table 820 lists the numerical shows the well trajectory, inner diameter (ID) and outer diameter (OD) of casing and cement, and the mechanical properties (such as Young's modulus (YM) and Poisson's ratio (PR)) of the casing, the cement, and the formation (all be measured depth (MD)) for case 2. Table 830 lists the predicted phase angle and perforation azimuth for minimum breakdown pressure for case 2.

Table 840 lists the numerical shows the well trajectory, inner diameter (ID) and outer diameter (OD) of casing and cement, and the mechanical properties (such as Young's modulus (YM) and Poisson's ratio (PR)) of the casing, the cement, and the formation (all be measured depth (MD)) for case 2. Table 850 lists the predicted phase angle and perforation azimuth for minimum breakdown pressure for case 3.

Table 810 gives the predicted minimum breakdown pressure and the corresponding perforation phase angle and perforation azimuth along the deviated wellbore, which has varying azimuth and deviation. Note, $P_{w\_min}$ is the minimum breakdown pressure. Phase_angle_1 and Perf_Azi_1 are the corresponding first perforation phase angle and perforation azimuth found through the model calculation. And Phase_angle_2 and Perf_Azi_2 are the corresponding second perforation phase angle and perforation azimuth found through the model calculation azimuth of the maximum horizontal stress. The two perforations have a difference of 180° in phase angle and perforation azimuth. From the tables 810, 830 and 850, one can see the optimal perforation phase angle and perforation azimuth, which can lower the breakdown pressure for initiating transverse fractures.

In embodiments, the present techniques output a perforation orientation to a control system that can rotate the shaped charges are fired in the optimal perforation orientation. In practice, the orientation can be generally indicated through a gyroscope, which is a device that uses Earth's gravity to help determine orientation. Once the optimal perforation direction is calculated, a control processor transmits the right perforation orientation to the gyroscope, which works with a mechanical system with a rotation or swivel mechanism that could control orientation of shaped charges even the system is being subjected to an arduous navigation demands of severe doglegs within the deviated and cased hole sections. The system can withstand the torque and drag forces imposed on it while traveling to the desired perforation intervals in the downhole condition. The method and system directing rotation of charged guns downhole would greatly reduce the operation error and further improve the overall efficiency of oriented perforation. In embodiments, the perforating gun is oriented in the optimal perforation orientation (perforation angle and perforation azimuth) and receives instructions from an embedded processor. The instructions are used to control the perforating devices being rotated and charged gun to be fired at the optimal perforation orientation. This can ensure that at least two perforation tunnels from one perforation cluster are created at the optimal perforation orientation which needs a lowest breakdown pressure for a given in-situ stresses and well trajectory.

Figure 9:
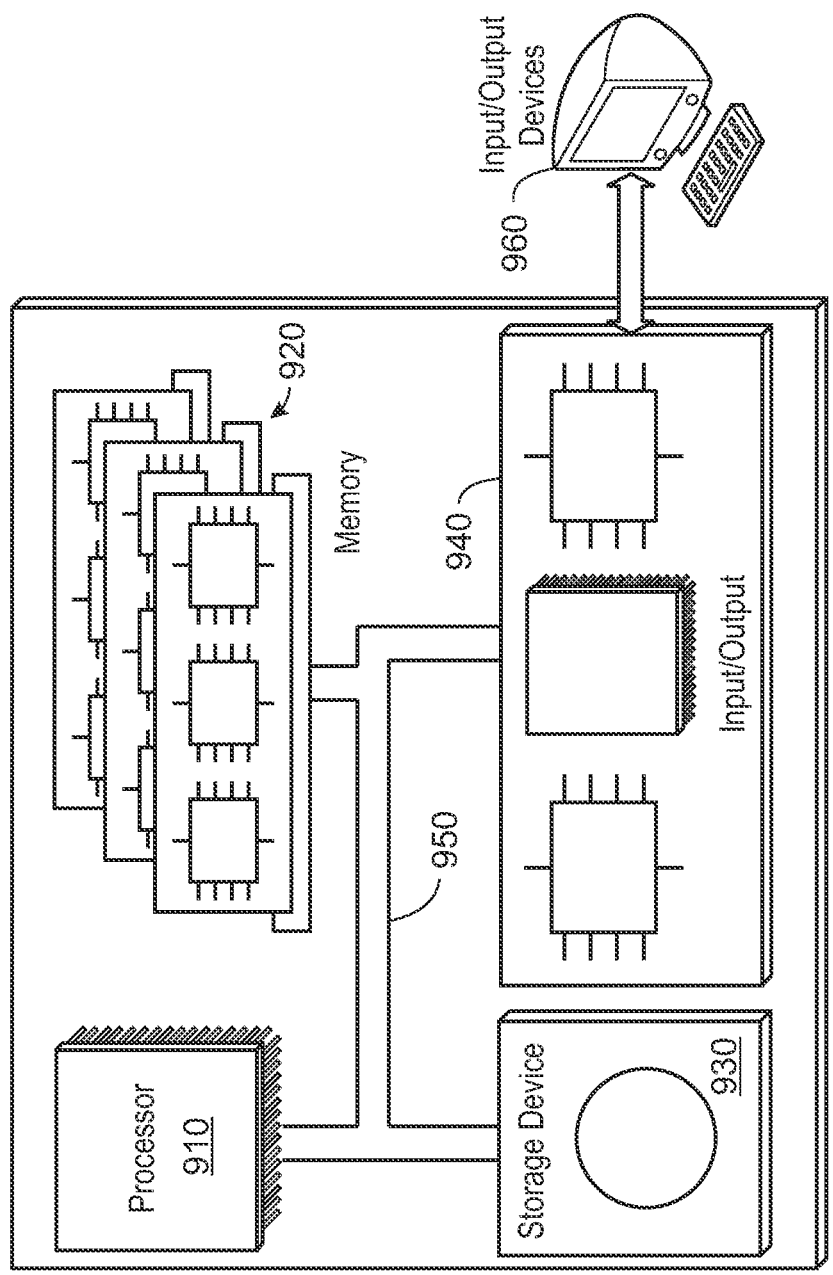
FIG. 9 is a schematic illustration of an example controller determining an optimal perforation orientation for hydraulic fracturing slant wells according to the present disclosure.

FIG. 9 is a schematic illustration of an example controller 900 (or control system) determining an optimal perforation orientation for hydraulic fracturing slant wells according to the present disclosure. For example, the controller 900 may include or be part of the control system 146 shown in FIG. 1. The controller 900 is intended to include various forms of digital computers, such as printed circuit boards (PCB), processors, digital circuitry, or otherwise parts of a system determining an optimal perforation orientation for hydraulic fracturing slant wells. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 900 includes a processor 910, a memory 920, a storage device 930, and an input/output device interface 940 (for displays, input devices, example, sensors, valves, pumps). Each of the components 910, 920, 930, and 940 are interconnected using a system bus 950. The processor 910 is capable of processing instructions for execution within the controller 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the controller 900. In one implementation, the memory 920 is a computer-readable medium. In one implementation, the memory 920 is a volatile memory unit. In another implementation, the memory 920 is a nonvolatile memory unit.

The storage device 930 is capable of providing mass storage for the controller 900. In one implementation, the storage device 930 is a computer-readable medium. In various different implementations, the storage device 930 may be a floppy disk device, a hard disk device, an optical disk device, or a tape device.

The input/output interface 940 provides input/output operations for the controller 900. In one implementation, the input/output interface 940 is communicatively coupled with input/output devices 960 including a keyboard and/or pointing device. In another implementation, the input/output devices 950 include a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files: such devices include magnetic disks, such as internal hard disks and removable disks: magneto-optical disks; and optical disks. Storage devices suitable for tangibly embodying computer program instructions and data include all forms of non-volatile memory, including by way of example semiconductor memory devices, such as EPROM, EEPROM, and flash memory devices: magnetic disks such as internal hard disks and removable disks; magneto-optical disks; and CD-ROM and DVD-ROM disks. The processor and the memory can be supplemented by, or incorporated in, ASICs (application specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

Other implementations are also within the scope of the following claims.

What is claimed is:

1. A computer-implemented method for determining an optimal perforation orientation of a subterranean formation for a hydraulic fracturing treatment, the method comprising:
   calculating, with one or more hardware processors, in-situ stresses from a log for a portion of a wellbore formed from a terranean surface into a subterranean formation;
   transforming, with the one or more hardware processors, the calculated in-situ stresses from the log for the portion of the wellbore from a global coordinate system to a wellbore coordinate system at a perforation cluster of the wellbore that comprises at least one perforation tunnel for the hydraulic fracturing treatment;
   transforming, with the one or more hardware processors, the transformed, calculated in-situ stresses from the wellbore coordinate system to a perforation coordinate system through at least one rotation matrix;
   calculating, with the one or more hardware processors, a perforation point in the wellbore coordinate system for respective trial perforation phase angles of the perforation cluster;
   transforming, with the one or more hardware processors, the perforation point in the wellbore coordinate system to the global coordinate system translated without rotations for the respective trial perforation phase angles;
   selecting, with the one or more hardware processors, a target perforation phase angle from the respective trial perforation phase angles at a minimum breakdown pressure for the perforation cluster; and
   calculating, with the one or more hardware processors, a perforation azimuth and a perforation dip for the perforation cluster at the minimum breakdown pressure for the target perforation phase angle, wherein the perforation azimuth and the target perforation phase angle are used to control one or more perforation devices being rotated and charged to fire for the hydraulic fracturing treatment at the perforation azimuth and the perforation dip to reduce operation error.

2. The computer-implemented method of claim 1, wherein the perforation along the target perforation phase angle orientation minimizes a breakdown pressure for fracture initiation for the hydraulic fracturing treatment.

3. The computer-implemented method of claim 1, wherein the global coordinate system comprises an x-axis directed toward north, a y-axis directed toward east, and a z-axis directed vertically downwards from the terranean surface, and the wellbore coordinate system is defined by a measured depth, a wellbore deviation, and a wellbore azimuth, and transforming the in-situ stresses from the global coordinate system to the wellbore coordinate system comprises:
   rotating the wellbore deviation about the y-axis; and
   rotating the wellbore azimuth about the z-axis.

4. The computer-implemented method of claim 1, wherein transforming the in-situ stresses from the wellbore coordinate system to the perforation coordinate system through the at least one rotation matrix comprises:
   rotating ninety degrees about a second y-axis of the well bore coordinate system; and
   rotating a perforation phase angle about a third z-axis of the well bore coordinate system.

5. The computer-implemented method of claim 1, wherein determining one or more stresses around a wellbore-perforation interface of the perforation tunnel from the in-situ stresses in the perforation coordinate system comprises:

determining a far-field in-situ stress tensor that acts on a wellbore-perforation interface between a deviated portion of the wellbore and a perforation tunnel wall;

determining a bottom hole pressure that acts on the subterranean formation adjacent the perforation tunnel wall from a fracturing liquid inside a casing;

determining a pressure within the at least one perforation tunnel that induces stress on the perforation tunnel wall; and calculating the one or more stresses on the perforation tunnel wall from the determinations of the far-field in-situ stress tensor, the bottom hole pressure, and the pressure within the at least one perforation tunnel.

6. The computer-implemented method of claim 5, wherein determining the bottom hole pressure that acts on the subterranean formation adjacent the perforation tunnel wall from the fracturing liquid comprises determining a pressure at an interface of the subterranean formation and a cement layer that binds a wellbore casing to the subterranean formation based on a pressure of the fracturing liquid.

7. The computer-implemented method of claim 5, wherein determining the pressure within the at least one perforation tunnel that induces stress on the perforation tunnel wall comprises determining the pressure within the at least one perforation tunnel by subtracting a perforation pressure loss from the bottom hole pressure.

8. The computer-implemented method of claim 5, wherein calculating the one or more stresses at the perforation tunnel wall of the perforation tunnel from the determined one or more stresses on the wellbore-perforation interface comprises:

summing induced stresses based on the far-field in-situ stress tensor and the bottom hole pressure;

calculating local maximum and minimum stresses at the wellbore-perforation interface based on the far-field in-situ stress tensor and the bottom hole pressure; and calculating the one or more stresses around the at least one perforation tunnel.

9. The computer-implemented method of claim 1, further comprising:

generating, with the one or more hardware processors, data that comprises a graphic that represents the selected target perforation phase angle and perforation azimuth for the subterranean formation; and presenting the generated data through a graphical user interface (GUI).

10. A system, comprising:

one or more memory modules;

one or more hardware processors communicably coupled to the one or more memory modules, the one or more hardware processors configured to execute instructions stored on the one or more memory modules to perform operations comprising:

calculating in-situ stresses from a log for a portion of a wellbore formed from a terranean surface into a subterranean formation;

transforming the calculated in-situ stresses from the log for the portion of the wellbore from a global coordinate system to a wellbore coordinate system at a perforation cluster of the wellbore that comprises at least one perforation tunnel for a hydraulic fracturing treatment;

transforming the transformed, calculated in-situ stresses from the wellbore coordinate system to a perforation coordinate system through at least one rotation matrix;

determining pressure coefficients and a breakdown pressure for respective trial perforation phase angles at the perforation cluster;

calculating a perforation point in the wellbore coordinate system for the respective trial perforation phase angles of the perforation cluster;

transforming the perforation point in the wellbore coordinate system to the global coordinate system translated without rotations for the respective trial perforation phase angles;

selecting a target perforation phase angle from the respective trial perforation phase angles at a minimum breakdown pressure for the perforation cluster; and calculating a perforation azimuth and a perforation dip for the perforation cluster at the minimum breakdown pressure for the target perforation phase angle, wherein the perforation azimuth and the target perforation phase angle are used to control one or more perforation devices being charged and rotated for the hydraulic fracturing treatment at the perforation azimuth and the perforation dip to reduce operation error.

11. The system of claim 10, wherein the perforation along the target perforation phase angle orientation minimizes a breakdown pressure for fracture initiation the hydraulic fracturing treatment.

12. The system of claim 10, wherein the global coordinate system comprises an x-axis directed toward north, a y-axis directed toward east, and a z-axis directed vertically downwards from the terranean surface, and the wellbore coordinate system is defined by a measured depth, a wellbore deviation, and a wellbore azimuth, and transforming the in-situ stresses from the global coordinate system to the wellbore coordinate system comprises:

rotating the wellbore deviation about the y-axis; and rotating the wellbore azimuth about the z-axis.

13. The system of claim 10, wherein transforming the in-situ stresses from the wellbore coordinate system to the perforation coordinate system through the at least one rotation matrix comprises:

rotating ninety degrees about a second y-axis of the wellbore coordinate system; and rotating a perforation phase angle about a third z-axis of the wellbore coordinate system.

14. The system of claim 10, wherein determining one or more stresses at a wellbore-perforation interface of the perforation tunnel from the in-situ stresses in the perforation coordinate system comprises:

determining a far-field in-situ stress tensor that acts on a wellbore-perforation interface between a deviated portion of the well bore and a perforation tunnel wall;

determining a bottom hole pressure that acts on the subterranean formation adjacent the perforation tunnel wall from a fracturing liquid inside a casing;

determining a pressure within the at least one perforation tunnel that induces stress on the perforation tunnel wall; and calculating the one or more stresses on the perforation tunnel wall from the determinations of the far-field in-situ stress tensor, the bottom hole pressure, and the pressure within the at least one perforation tunnel.

15. The system of claim 10, further comprising:

generating, with the one or more hardware processors, data that comprises a graphic that represents the selected target perforation phase angle and perforation azimuth for the subterranean formation; and presenting the generated data through a graphical user interface (GUI).

16. An apparatus comprising a non-transitory, computer readable, storage medium that stores instructions that, when executed by at least one processor, cause the at least one processor to perform operations comprising:

calculating in-situ stresses from a log for a portion of a wellbore formed from a terranean surface into a subterranean formation;

transforming the calculated in-situ stresses from the log for the portion of the wellbore from a global coordinate system to a wellbore coordinate system at a perforation cluster of the wellbore that comprises at least one perforation tunnel for a hydraulic fracturing treatment;

transforming the transformed, calculated in-situ stresses from the wellbore coordinate system to a perforation coordinate system through at least one rotation matrix;

determining pressure coefficients and a breakdown pressure for respective trial perforation phase angles at the perforation cluster;

calculating a perforation point in the wellbore coordinate system for the respective trial perforation phase angle of the perforation cluster;

transforming the perforation point in the wellbore coordinate system to the global coordinate system translated without rotations for the respective trial perforation phase angles;

selecting a target perforation phase angle from the respective trial perforation phase angles at a minimum breakdown pressure for the perforation cluster; and calculating a perforation azimuth and a perforation dip for the perforation cluster at the minimum breakdown pressure for the target perforation phase angle, wherein the perforation azimuth and the target perforation phase angle are used to control one or more perforation devices being rotated and charged to fire for the hydraulic fracturing treatment at the perforation azimuth and the perforation dip to reduce operation error.

17. The apparatus of claim 16, wherein the perforation along the target perforation phase angle minimizes a breakdown pressure for fracture initiation the hydraulic fracturing treatment.

* * * * *

UNITED STATES PATENT AND TRADEMARK OFFICE
CERTIFICATE OF CORRECTION

PATENT NO. : 12,241,361 B2  
APPLICATION NO. : 17/410756  
DATED : March 4, 2025  
INVENTOR(S) : Kaiming Xia and Yufeng Cui Page 1 of 1

It is certified that error appears in the above-identified patent and that said Letters Patent is hereby corrected as shown below:

On the Title Page

Column 2, Abstract section, Lines 4-5, please replace "well bore formed and" with -- well bore and --.

Signed and Sealed this  
Twenty-first Day of October, 2025

John A. Squires  
*Director of the United States Patent and Trademark Office*